US009886737B2

(12) United States Patent
Wilt et al.

(10) Patent No.: US 9,886,737 B2
(45) Date of Patent: Feb. 6, 2018

(54) LOCAL-TO-REMOTE MIGRATION FOR VIRTUALIZED GRAPHICS PROCESSING

(71) Applicant: Amazon Technologies, Inc., Seattle, WA (US)

(72) Inventors: Nicholas Patrick Wilt, Mercer Island, WA (US); Ashutosh Tambe, Bellevue, WA (US); Nathan Lee Burns, Mountain View, WA (US)

(73) Assignee: Amazon Technologies, Inc., Reno, NV (US)

( * ) Notice: Subject to any disclaimer, the term of this patent is extended or adjusted under 35 U.S.C. 154(b) by 7 days.

(21) Appl. No.: 14/938,461

(22) Filed: Nov. 11, 2015

(65) Prior Publication Data

US 2017/0132745 A1    May 11, 2017

(51) Int. Cl.
| G06F 9/455 | (2006.01) |
| G06T 1/20 | (2006.01) |
| G06F 9/445 | (2006.01) |
| G06F 9/50 | (2006.01) |

(52) U.S. Cl.
CPC ............... *G06T 1/20* (2013.01); *G06F 9/445* (2013.01); *G06F 9/45558* (2013.01); *G06F 9/50* (2013.01); *G06F 2009/45562* (2013.01)

(58) Field of Classification Search
None
See application file for complete search history.

(56) References Cited

U.S. PATENT DOCUMENTS

| 9,069,622 | B2 | 6/2015 | Post et al. |
| 9,098,323 | B2 | 8/2015 | Mitra et al. |
| 2007/0033156 | A1 | 2/2007 | Limpert et al. |
| 2011/0083131 | A1 | 4/2011 | Pirzada et al. |
| 2011/0134111 | A1 | 6/2011 | Stone |
| 2011/0182422 | A1 | 7/2011 | Anderson et al. |
| 2012/0069032 | A1 | 3/2012 | Hansson et al. |
| 2014/0055466 | A1 | 2/2014 | Petrov et al. |
| 2014/0176583 | A1 | 6/2014 | Abiezzi et al. |
| 2014/0181806 | A1 | 6/2014 | Abiezzi et al. |
| 2014/0215462 | A1* | 7/2014 | Kuo .................... G06F 9/45533 718/1 |

(Continued)

OTHER PUBLICATIONS

U.S. Appl. No. 15/178,292, filed Jun. 9, 2016, Nicholas Patrick Wilt.

(Continued)

*Primary Examiner* — Yingchun He
(74) *Attorney, Agent, or Firm* — Robert C. Kowert; Meyertons, Hood, Kivlin, Kowert & Goetzel, P.C.

(57) ABSTRACT

Methods, systems, and computer-readable media for local-to-remote migration for virtualized graphics processing are disclosed. A virtual compute instance comprising a local GPU is provisioned from a provider network. The provider network comprises a plurality of computing devices configured to implement a plurality of virtual compute instances with multi-tenancy. A virtual GPU is attached to the virtual compute instance. The virtual GPU is implemented using a physical GPU, and the physical GPU is accessible to the virtual compute instance over a network. Graphics processing for the virtual compute instance is migrated from the local GPU to the virtual GPU. An application is executed using the virtual GPU on the virtual compute instance.

20 Claims, 16 Drawing Sheets

(56) References Cited

U.S. PATENT DOCUMENTS

| | | | |
|---|---|---|---|
| 2015/0067672 A1* | 3/2015 | Mitra | G06F 9/45533 |
| | | | 718/1 |
| 2015/0097844 A1* | 4/2015 | Wankhede | G06T 1/20 |
| | | | 345/505 |
| 2015/0116335 A1 | 4/2015 | Chen et al. | |
| 2015/0220354 A1 | 8/2015 | Nair | |
| 2015/0221063 A1 | 8/2015 | Kim et al. | |
| 2015/0370620 A1 | 12/2015 | Lai et al. | |
| 2016/0247248 A1* | 8/2016 | Ha | G06F 9/455 |

OTHER PUBLICATIONS

U.S. Appl. No. 15/177,255, filed Jun. 8, 2016, Nicholas Patrick Wilt.
U.S. Appl. No. 15/177,262, filed Jun. 8, 2016, Nicholas Patrick Wilt.
U.S. Appl. No. 14/822,511, filed Aug. 10, 2015, Nicholas Patrick Wilt et al.
Federico Silla. "The rCUDA technology: an inexpensive way to improve the performance of GPU-based clusters." Talk Computer Engineering Laboratory, Delft University of Technology. Delft, Netherlands. Apr. 2015, pp. 1-47.
Antonio J. Pena, et al., "A Complete and Efficient CUDA-Sharing Solution for HPC Clusters", Sep. 2, 2014, from the Internet: URL: http://www.mcs.anl.gov/papers/P5137-0514.pdf, pp. 1-28.
NICE, "DCV Administration Guide," NICE s.r.l, Asti, Italy, Jul. 2015, Source: https://www.nice-software.com/download/nice-dcv-2014#documentation, pp. 1-96.
U.S. Appl. No. 14/938,457, filed Nov. 11, 2015, Nicholas Patrick Wilt et al.
U.S. Appl. No. 14/938,656, filed Nov. 11, 2015, Nicholas Patrick Wilt et al.
U.S. Appl. No. 14/938,654, filed Nov. 11, 2015, Nicholas Patrick Wilt et al.
Lin Shi, et al., "vCUDA: GPU-Accelerated High-Performance Computing in Virtual Machines", IEEE Transaction on computers, vol. 61, No. 6, Jun. 2012, pp. 804-816.
Matthew Danish, et al., "Virtual-CPU Scheduling in the Quest Operating System", 2011 17th IEEE Real-Time and Embedded Technology and Application Symposium, Apr. 11, 2011, pp. 169-179.
Mark Panahi, et al., "A Framework for Real-Time Service-Oriented Architecture", 2009 IEEE Conference on Commerce and Enterprise Computing (CED '09), Jul. 20, 2009, pp. 460-467.
Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.
Shinpei Kato, et al., "Gdev: First-Class GPU Resource Management in the Operating System", Jun. 1, 2012, Retrieved from URL: https://www.usenix.org/system/files/conference/atc12/atc12-final319.pdf, pp. 1-12.

* cited by examiner

LOCAL-TO-REMOTE MIGRATION FOR VIRTUALIZED GRAPHICS PROCESSING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
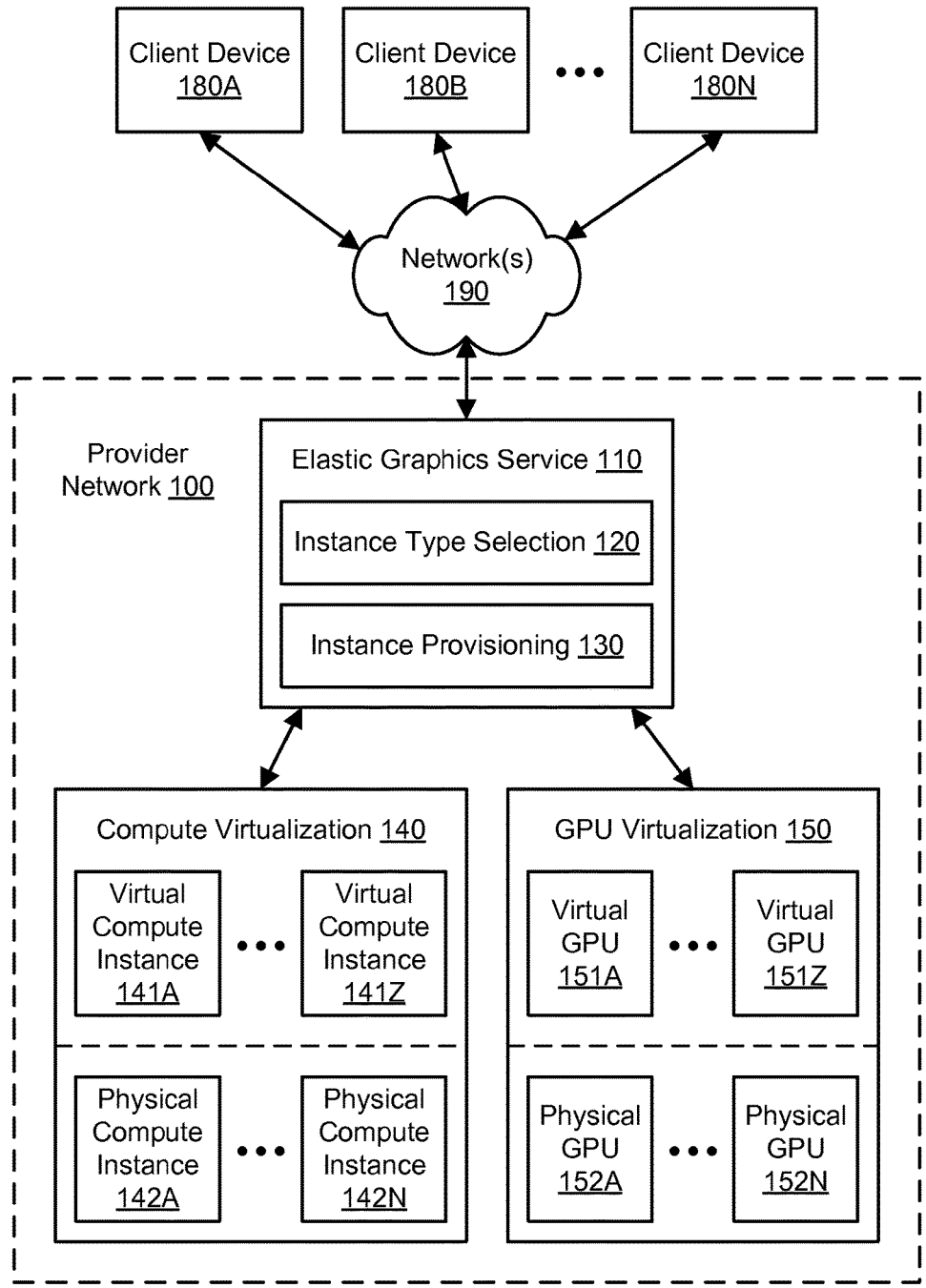
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for application-specific virtualized graphics processing are described. Using the techniques described herein, a virtual compute instance may be provisioned. The virtual compute instance may be configured to execute an application. The application may be associated with graphics requirements. For example, an application manifest may specify a recommended graphics processing unit (GPU) class and/or size of video memory for the application, or analysis of execution of the application may determine graphics requirements for the application. A virtual GPU may be selected for the virtual compute instance based (at least in part) on the graphics requirements for the application. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. The application may be executed on the virtual compute instance using the virtual GPU. Additional applications on the virtual compute instance may use different application-specific virtual GPUs, and the application-specific virtual GPUs may vary in graphics processing capabilities based on the varying requirements of the applications.

Various embodiments of methods, systems, and computer-readable media for local-to-remote migration for virtualized graphics processing are described. Using the techniques described herein, a virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of physical compute instances 142A-142N. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying physical compute instances 142A-142N may be heterogeneous, and the underlying physical GPUs 152A-152N may be heterogeneous as well. In one embodiment, the compute virtualization 140 may use techniques for multi-tenancy to provision virtual compute instances 141A-141Z that exceed the physical compute instances 142A-142N in number. In one embodiment, the GPU virtualization 150 may use techniques for multi-tenancy to provision virtual GPUs 151A-151Z that exceed the physical GPUs 152A-152N in number.

The elastic graphics service 110 may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 11), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 11.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 11:
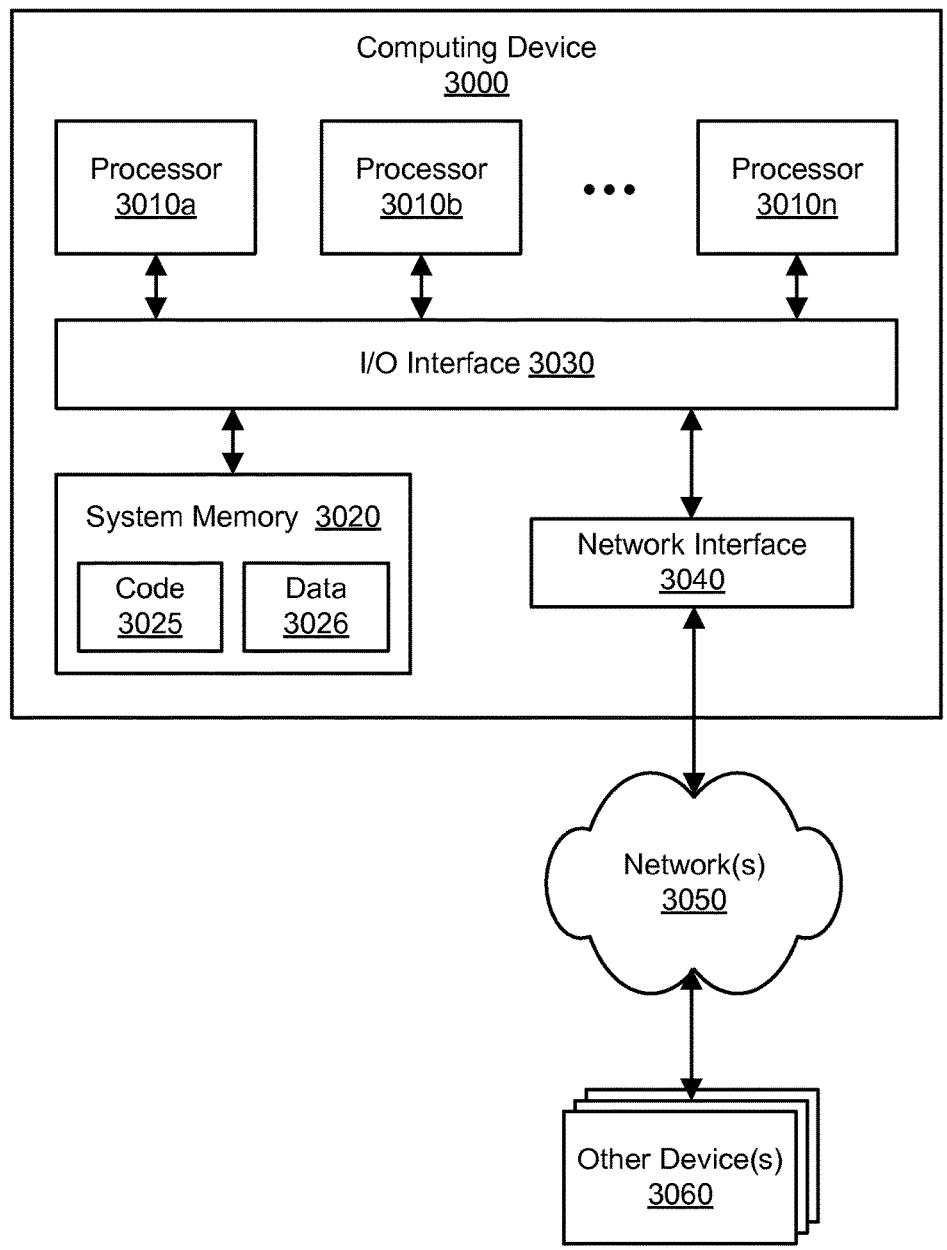
FIG. 11 illustrates an example computing device that may be used in some embodiments.

The provider network 100 may include a plurality of computing devices, any of which may be implemented by the example computing device 3000 illustrated in FIG. 11. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although physical compute instances 142A through 142N are shown for purposes of example and illustration, it is contemplated that different quantities and configurations of physical compute instances may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
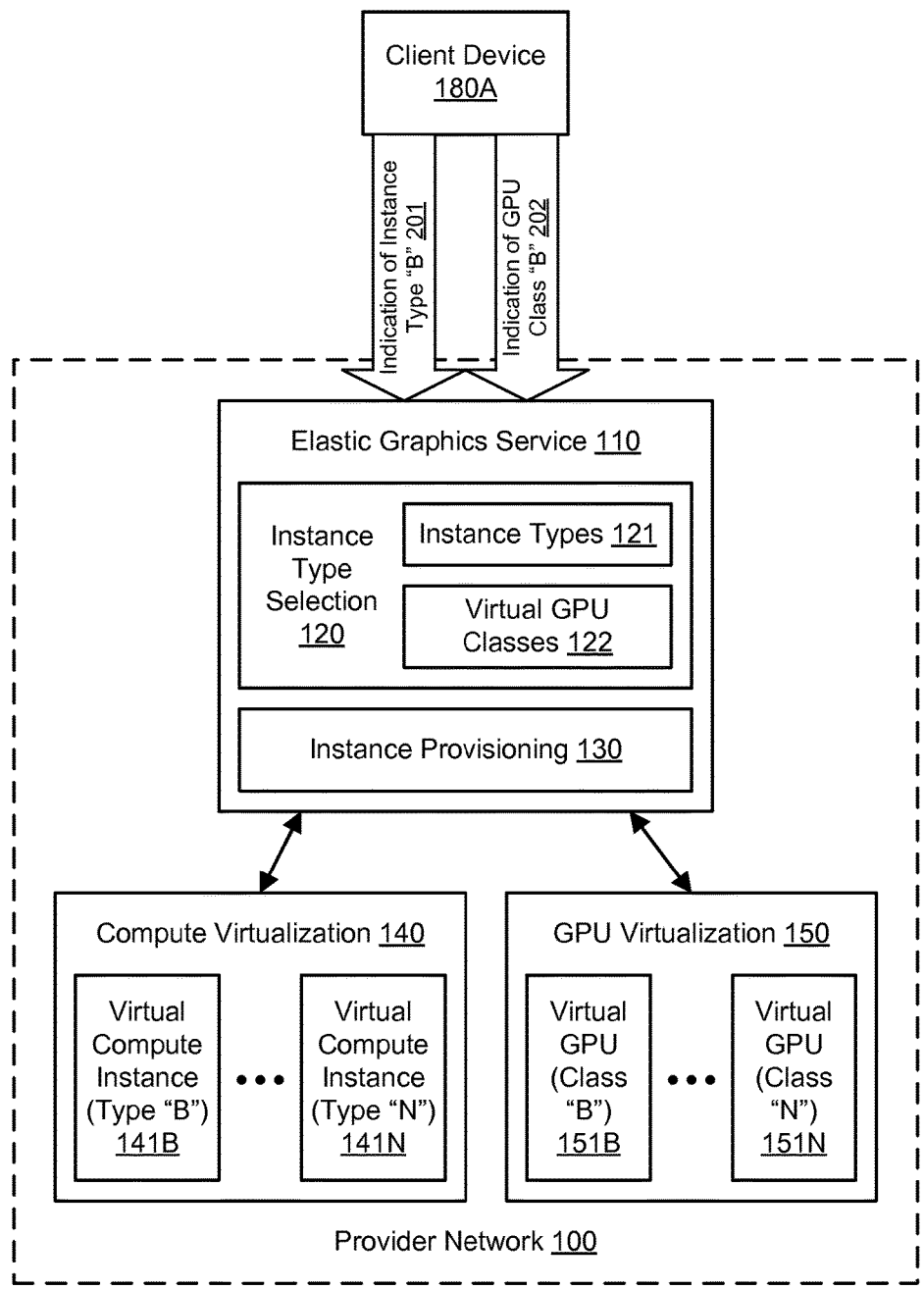
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
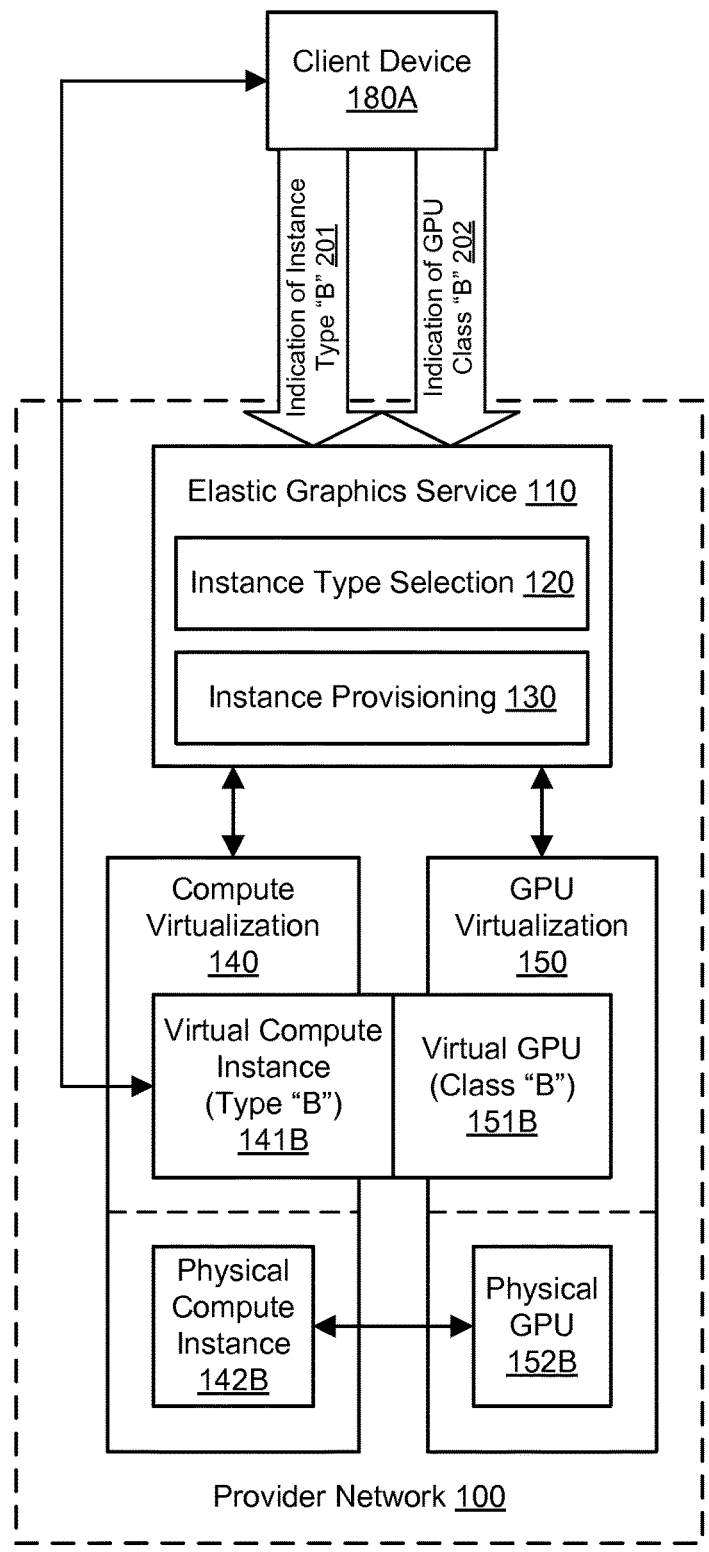
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a physical compute instance 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a physical compute instance 142B may communicate with a physical GPU 152B, e.g., over a network. The physical GPU 152B may be located in a different computing device than the physical compute instance 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
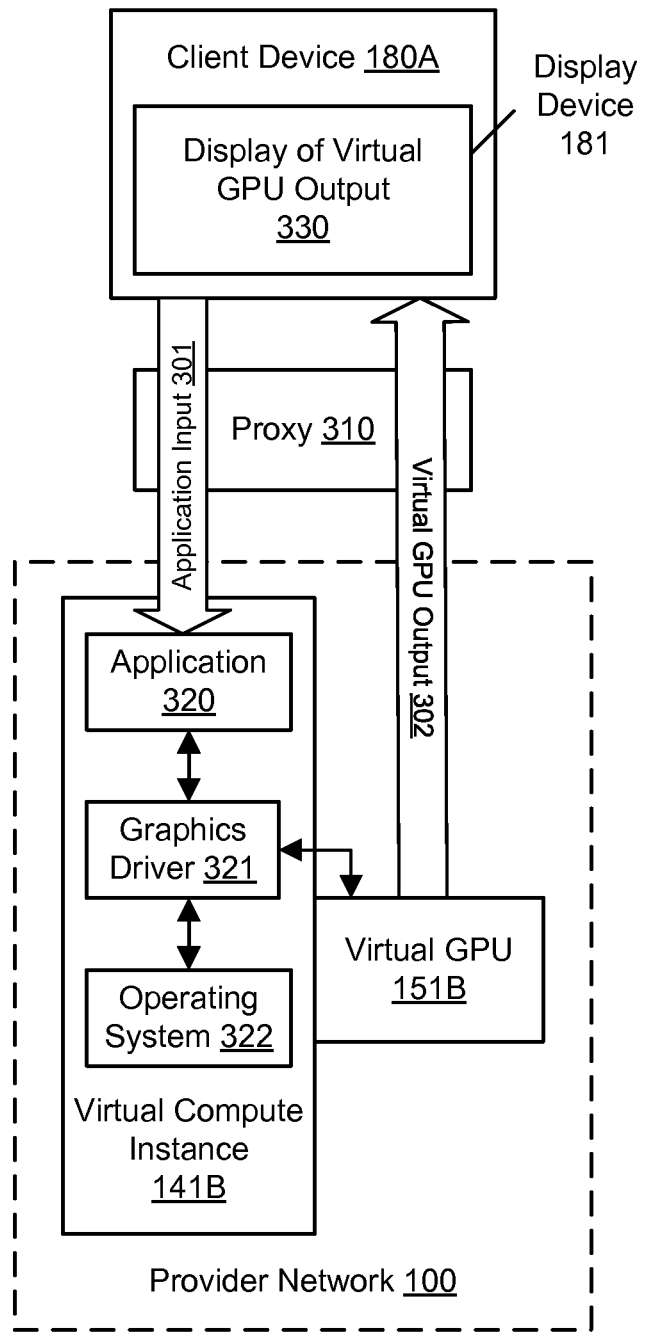
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying physical compute instance 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or co-processor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
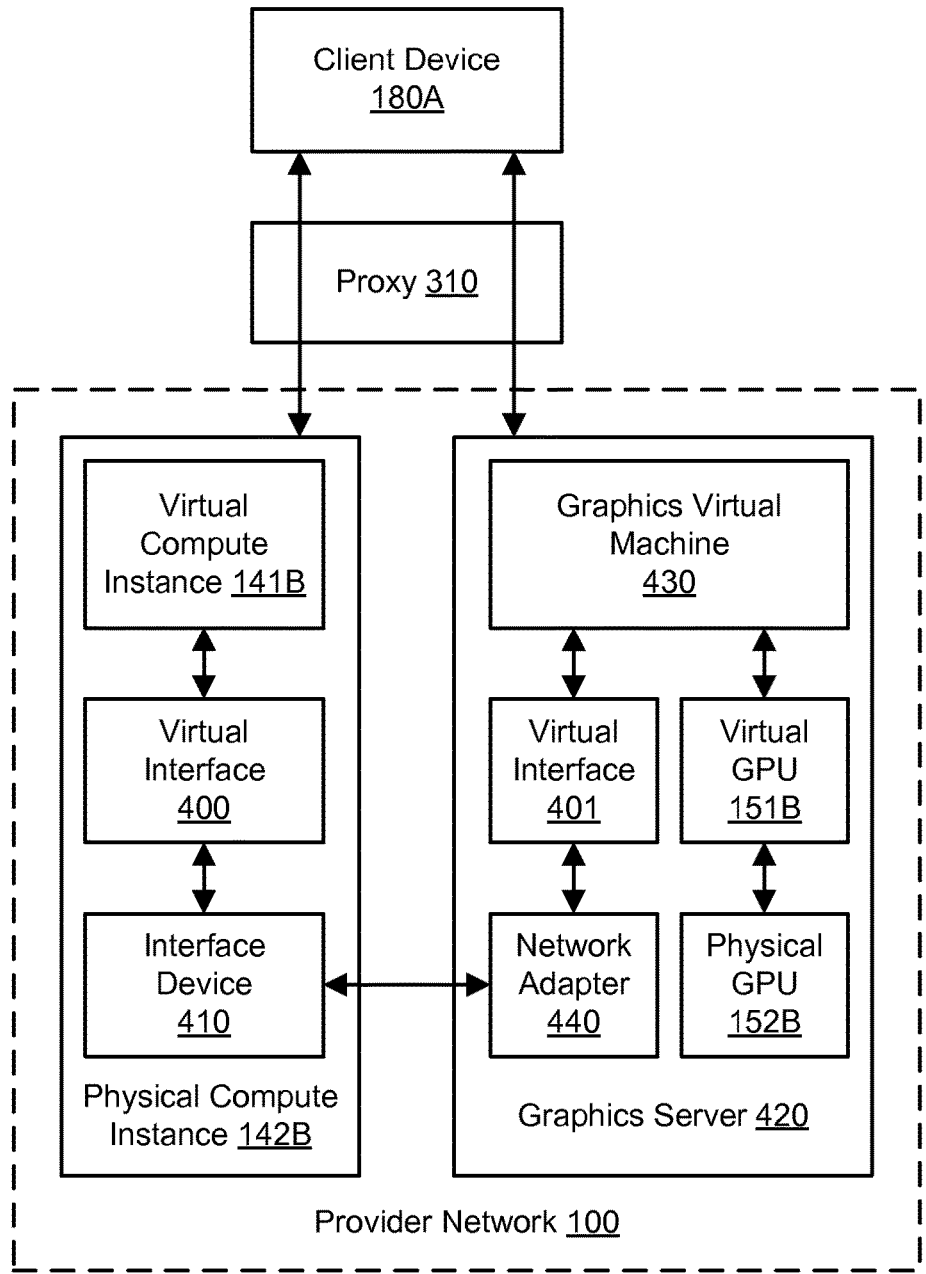
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a physical compute instance 142B, and the virtual GPU 151B attached to that instance 141B may be implemented using a separate and distinct computing device termed a graphics server 420. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the graphics server 420 (and thus with the physical GPU 152B) over a network. The interface device 410 may be implemented in any suitable manner, e.g., as an expansion card (such as a PCI Express card) or attached peripheral device for the physical compute instance 142B. The interface device 410 may use single root I/O virtualization to expose hardware virtual functions to the virtual compute instance 141B. In one embodiment, the physical compute instance 142B may implement a plurality of virtual compute instances, each with its own virtual interface, and the virtual compute instances may use the interface device 410 to interact with the corresponding virtual GPUs on one or more graphics servers. The physical compute instance 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the graphics server 420, and the graphics server 420 may execute the commands on behalf of the interface device. The graphics server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The graphics server 410 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the graphics server 420 may implement a plurality of virtual GPUs (such as virtual GPU 151B) using one or more physical GPUs (such as physical GPU 152B), and the virtual GPUs may interact with the corresponding virtual compute instances on one or more physical compute instances over a network. The graphics server 420 may communicate with the proxy 310 using a suitable remoting protocol, e.g., to send data to and receive data from the client device 180A. For example, the graphics server 420 may generate virtual GPU output based on the commands sent from the interface device 410. The virtual GPU output may be provided to the client device 180A through the proxy 310, e.g., from the physical compute instance 142B or graphics server 420.

Figure 5:
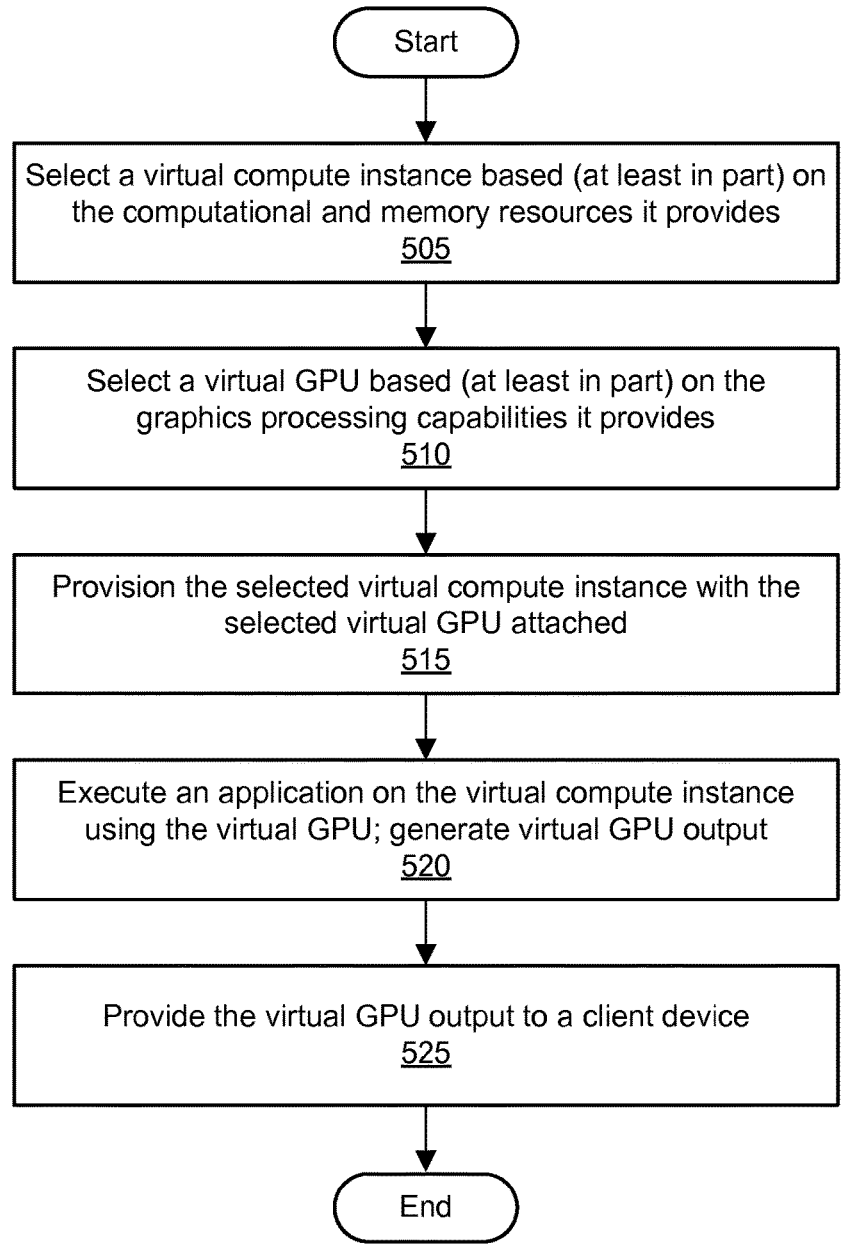
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Application-Specific Virtualized Graphics Processing

In some embodiments, virtualized graphics processing may be provided on an application-specific basis. Using the techniques discussed above for virtualized graphics processing in a provider network, a virtual compute instance may be provisioned. The virtual compute instance may be configured to execute a particular application. As will be discussed in greater detail below, a virtual GPU may be attached to the virtual compute instance specifically for use by the particular application. The application-specific virtual GPU may be dedicated to the particular application, and other applications running on the virtual compute instance may have no access to this particular virtual GPU. In one embodiment, a plurality of applications on the virtual compute instance may have their own dedicated virtual GPUs. The capabilities of the virtual GPUs may vary based on characteristics of the associated applications. In one embodiment, one or more other applications on the virtual compute instance may not have access to any virtual GPUs, e.g., if the graphics requirements for the other applications are not sufficient to justify the cost of a virtual GPU. As used herein, the term "application" generally includes a set of program instructions, a software package, or a set of interconnected software resources designed to perform a set of coordinated functions when executed on a compute instance, often on top of an operating system resident on the compute instance.

Figure 6A:
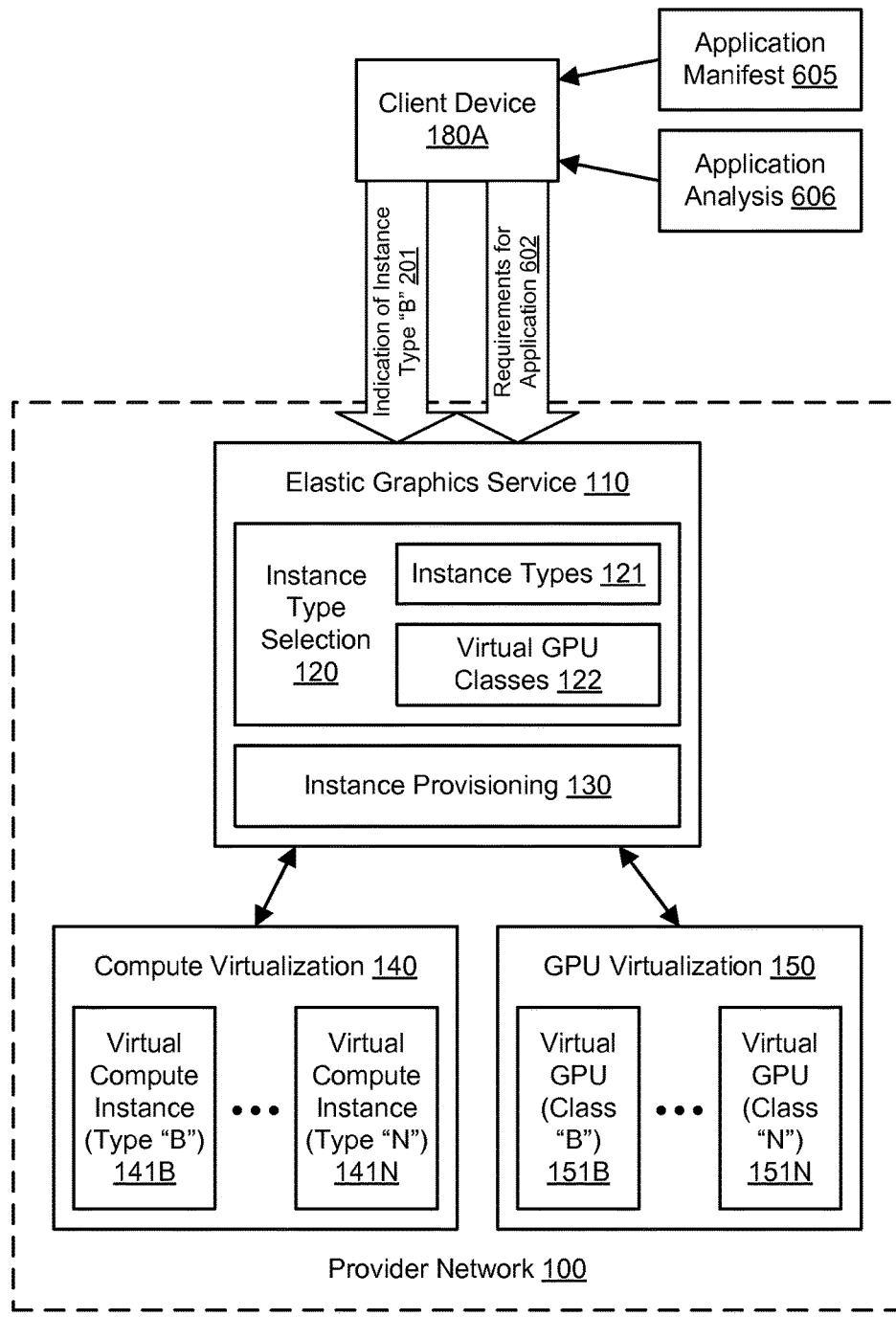
FIG. 6A illustrates an example system environment for application-specific virtualized graphics processing, including selection of a virtual GPU based (at least in part) on requirements for an application, according to one embodiment.

FIG. 6A illustrates an example system environment for application-specific virtualized graphics processing, including selection of a virtual GPU based (at least in part) on requirements for an application, according to one embodiment. An application on a virtual compute instance may be associated with a set of requirements 602. The requirements 602 may include requirements for graphics processing and/or computational requirements and may also be referred to herein as graphics requirements. For example, the graphics requirements 602 may specify a recommended graphics processing unit (GPU) class, a recommended size for video memory, or other GPU features and/or configurations that are recommended to run the application. In one embodiment, the graphics requirements 602 may be determined using an application manifest 605 that specifies required or recommended characteristics of a platform (e.g., computational and memory requirements) or environment for executing the application, including characteristics of a physical compute instance or virtual compute instance. The application manifest 605 may be determined and provided by a developer of the corresponding application who seeks a degree of control over the type of platform or environment on which the application is executed. The application may be implemented using an application virtualization container, and the manifest may be provided with the container for the application.

In one embodiment, programmatic analysis 606 of the application may determine the graphics requirements 602 for the application. The application analysis 606 may include runtime analysis of a graphics workload demanded by the application and/or analysis of an execution history (including graphics workload) of the application, e.g., using similar virtual hardware as the current instance. The graphics workload for the application, either current or historical, may be based on any suitable metrics relating to use of a virtual GPU or underlying physical GPU, such as the number of primitives sent to the GPU, the number of operations requested of the GPU, the video memory used by the GPU, and/or the rate of output from the GPU over a period of time.

In one embodiment, the graphics requirements 602 may be provided to the elastic graphics service 110 by a client 180A. In one embodiment, the elastic graphics service 110 may determine the graphics requirements 602 directly from the application manifest 605 and/or application analysis 606. As shown in FIG. 6A, if the client 180A also seeks to provision a virtual compute instance, the client may provide an indication of the requested instance type 201 for the virtual compute instance along with the graphics requirements 602 for the application-specific virtual GPU. However, the client may also provide the graphics requirements 602 for the application-specific virtual GPU for a virtual compute instance that has already been provisioned and potentially used to execute one or more applications.

As discussed above, the elastic graphics service 110 may offer, to clients, selection and provisioning of virtualized compute instances with attached virtualized GPUs, including application-specific virtual GPUs. The elastic graphics service 110 may include an instance type selection functionality 120 and an instance provisioning functionality 130. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. The client device 180A may provide application-specific graphics requirements 602 that the instance type selection functionality 120 may use to select a particular virtual GPU class. For example, the graphics requirements 602 may specify or map directly to the virtual GPU class "B" from a predefined set of virtual GPU classes. As another example, the graphics requirements 602 may specify the desired resources of a virtual GPU class, and the instance type selection functionality 120 may select the virtual GPU class "B" based on such requirements. If the graphics requirements specify a minimum set of resources for a virtual GPU to be used with an application, then a virtual GPU may be selected that meets or exceeds those minimum set of resources. Accordingly, the virtual GPU class may be selected by the client or on behalf of the client for use with a particular application having particular requirements.

In some circumstances, the class of virtual GPU dictated by the graphics requirements for the application may not be available. The virtual GPU class may not be available for technical reasons (e.g., during a busy period) or for business reasons (e.g., the selected GPU class is more expensive than permitted by an agreement between the user and the provider network). In such circumstances, the elastic graphics service may either return an indication of failure or attempt to reconcile the difference between the requested virtual GPU class and the available virtual GPUs. If a virtual GPU of a lesser class is available, the elastic graphics service may prompt the user for approval. In one embodiment, the elastic graphics service may seek user approval to wait until the requested virtual GPU class is available at an acceptable cost.

Figure 6B:
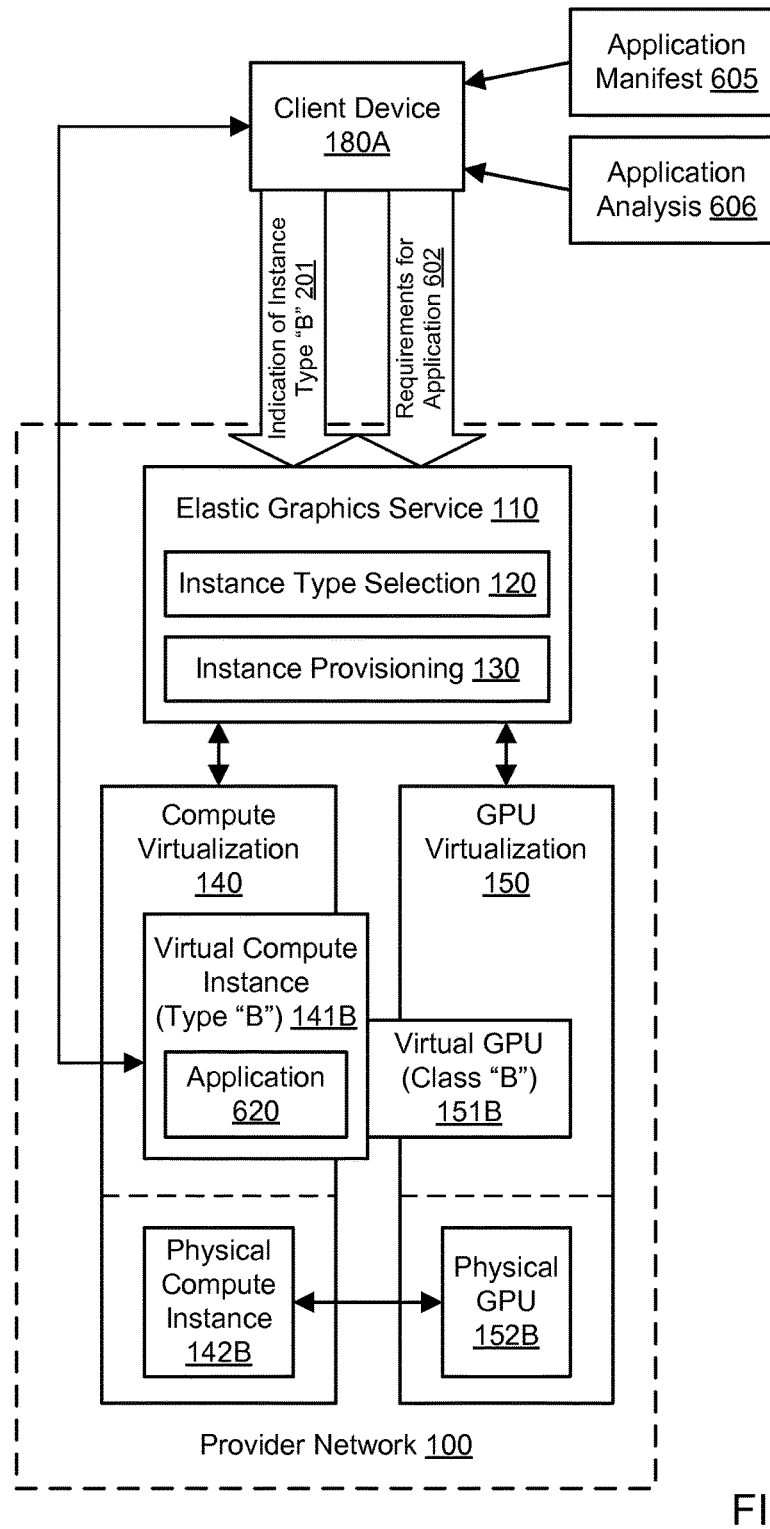
FIG. 6B illustrates further aspects of the example system environment for application-specific virtualized graphics processing, including provisioning of a virtual compute instance with an application-specific virtual GPU attached, according to one embodiment.

FIG. 6B illustrates further aspects of the example system environment for application-specific virtualized graphics processing, including provisioning of a virtual compute instance with an application-specific virtual GPU attached, according to one embodiment. The instance provisioning functionality 130 may provision a virtual compute instance 141B with an attached virtual GPU 151B based on the specified instance type "B" and the virtual GPU class "B" selected based (at least in part) on the application-specific requirements 602. The provisioned virtual compute instance 141B may be implemented by the compute virtualization functionality 140 using suitable physical resources such as a physical compute instance 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a physical compute instance 142B may communicate with a physical GPU 152B, e.g., over a network. The physical GPU 152B may be located in a different computing device than the physical compute instance 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

The virtual compute instance 141B may be configured to execute an application 620. Execution of the application 620 may include using the virtual GPU 151B to generate output based on data supplied to the virtual GPU by the application. The virtual GPU 151B may be attached to the virtual compute instance 141B specifically for use by the particular application 620. The application-specific virtual GPU 151B may be dedicated to the particular application 620, and other applications running on the virtual compute instance 141B may have no access to this particular virtual GPU 151B.

Figure 7A:
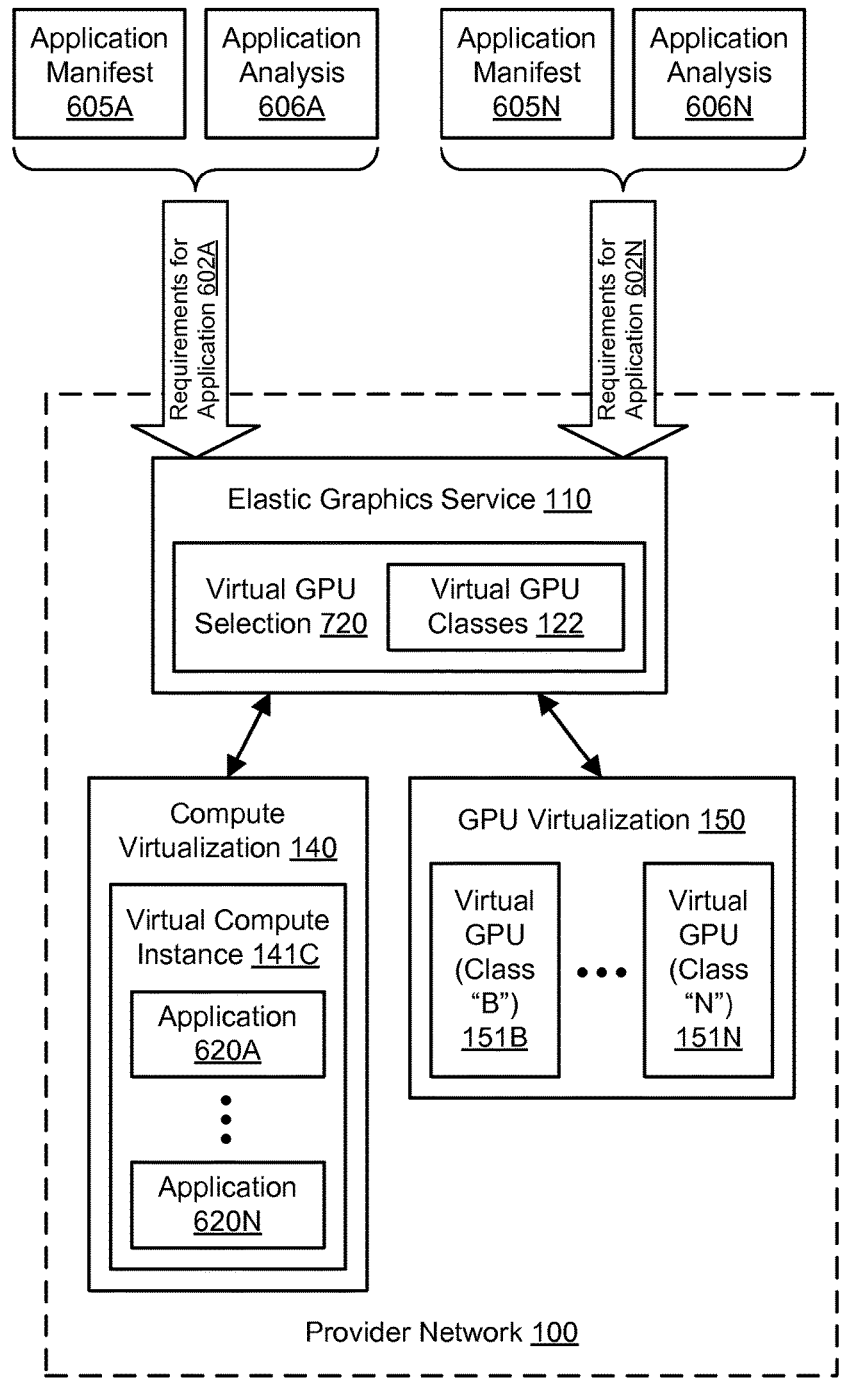
FIG. 7A illustrates further aspects of the example system environment for application-specific virtualized graphics processing, including selection of a plurality of virtual GPUs based (at least in part) on requirements for a plurality of applications, according to one embodiment.

FIG. 7A illustrates further aspects of the example system environment for application-specific virtualized graphics processing, including selection of a plurality of virtual GPUs based (at least in part) on requirements for a plurality of applications, according to one embodiment. In one embodiment, a plurality of applications on the virtual compute instance may have their own dedicated virtual GPUs. The capabilities of the virtual GPUs may vary based on characteristics of the associated applications. As shown in the example of FIG. 7A, a virtual compute instance 141C may be provisioned by the compute virtualization facility 140 using resources of a multi-tenant provider network 100. In various embodiments, the virtual compute instance 141C may be provisioned and used (e.g., to execute one or more applications) before any virtual GPUs are attached or at the same time as the virtual GPUs are attached. The virtual compute instance 141C may be configured to execute a plurality of applications, such as application 620A through application 620N. The applications 620A-620N may be installed on the virtual compute instance 141C from any source. The applications 620A-620N may vary in their computational requirements and graphics requirements. The virtual compute instance 141C may be configured to execute any two or more of the applications 620A-620N in a substantially simultaneous manner, e.g., using multiple processors or processor cores of the underlying physical compute instance and/or software-based multitasking techniques.

Each of the applications 620A-620N may be associated with a set of graphics requirements. As shown in FIG. 7A, the application 620A may be associated with requirements 602A, and the application 620N may be associated with requirements 602N. For example, the graphics requirements 602A-602N may specify a recommended graphics processing unit (GPU) class, a recommended size for video memory, or other GPU features and/or configurations that are recommended to run the corresponding application. In one embodiment, any of the graphics requirements 602A-602N may be determined using a corresponding application manifest 605A-605N that specifies required or recommended characteristics of a platform or environment for executing the corresponding application, including characteristics of a physical compute instance or virtual compute instance. The application manifest 605A-605N may be determined and provided by a developer of the corresponding application who seeks a degree of control over the type of platform or environment on which the application is executed. In one embodiment, programmatic analysis 606A-606N of the corresponding application 620A-620N may determine the graphics requirements 605 for the application. The application analysis 606A-606N may include runtime analysis of a graphics workload demanded by the application and/or analysis of an execution history (including graphics workload) of the application, e.g., using similar virtual hardware as the current instance. The graphics workload for the application, either current or historical, may be based on any suitable metrics relating to use of a virtual GPU or underlying physical GPU, such as the number of primitives sent to the GPU, the number of operations requested of the GPU, the video memory used by the GPU, and/or the rate of output from the GPU over a period of time.

In one embodiment, the graphics requirements 602A-602N may be provided to the elastic graphics service 110 by a client for whom the instance 141C was provisioned. In one embodiment, the elastic graphics service 110 may determine the graphics requirements 602A-602N directly from the application manifest 605A-605N and/or application analysis 606A-606N. As discussed above, the provider network 100 may offer to clients a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on.

The application-specific graphics requirements 602A-602N may be used by a virtual GPU selection functionality 720 to select, for any of the applications 620A-620N, a particular virtual GPU class from among the virtual GPU classes 122. For example, the graphics requirements 602A may specify or map directly to a virtual GPU class "C" from a predefined set of virtual GPU classes 122, and the graphics requirements 602N may specify or map directly to a virtual GPU class "N" from the set of virtual GPU classes. As another example, the graphics requirements 602A may specify the desired resources of a virtual GPU class, and the virtual GPU selection functionality 720 may select the virtual GPU class "C" based on such requirements. Similarly, the graphics requirements 602N may specify the desired resources of a virtual GPU class, and the virtual GPU selection functionality 720 may select the virtual GPU class "N" based on such requirements. If the graphics requirements specify a minimum set of resources for a virtual GPU to be used with an application, then a virtual GPU may be selected that meets or exceeds those minimum set of resources. Accordingly, the virtual GPU classes may be selected by the client or on behalf of the client for use with particular applications having particular requirements. In one embodiment, the elastic graphics service 110 may decline to select and attach a virtual GPU for a particular application based on its requirements, e.g., if the requirements are not sufficient to justify the cost of a virtual GPU and/or the additional latency introduced by GPU virtualization.

Figure 7B:
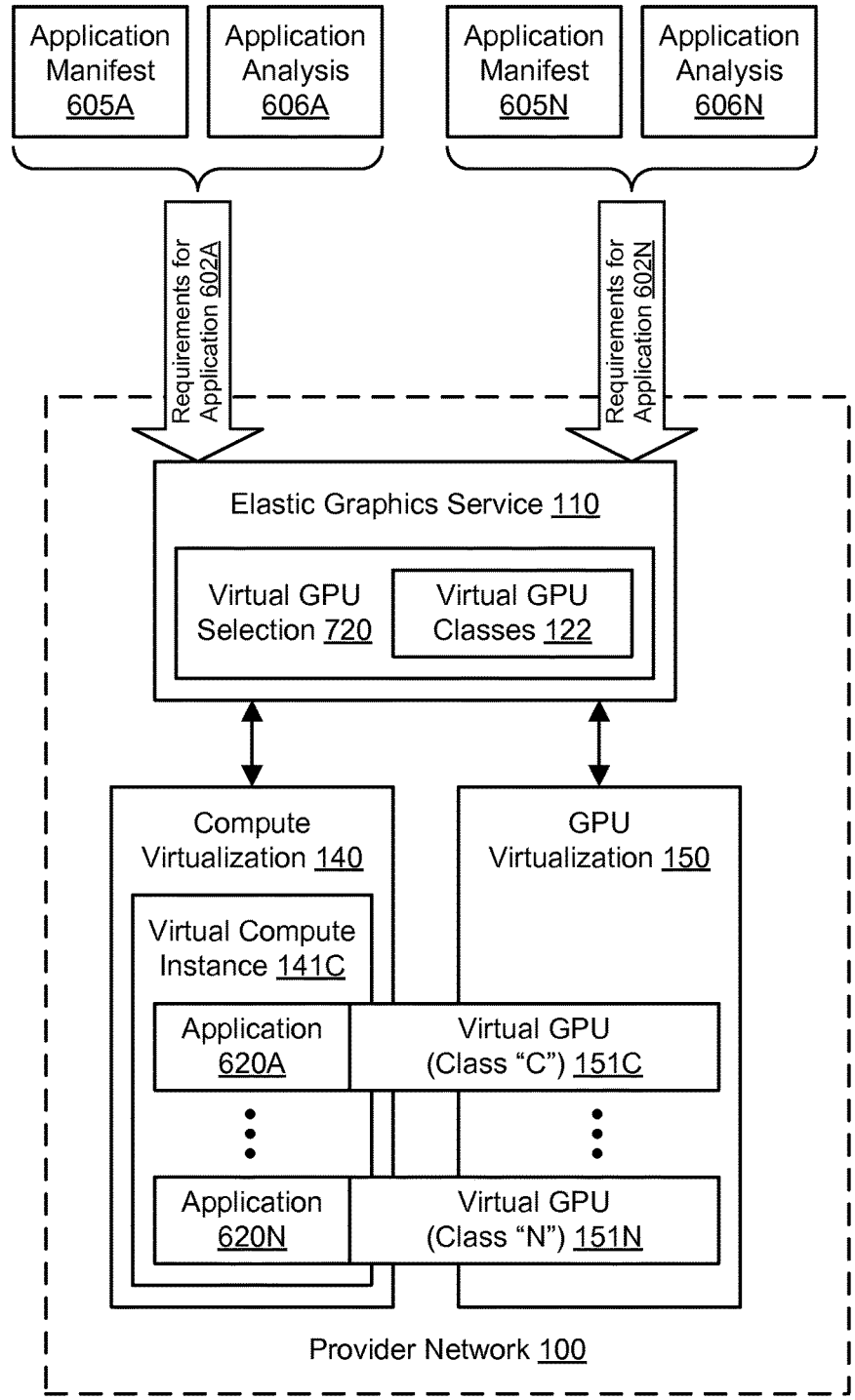
FIG. 7B illustrates further aspects of the example system environment for application-specific virtualized graphics processing, including provisioning of a virtual compute instance with a plurality of application-specific virtual GPUs attached, according to one embodiment.

FIG. 7B illustrates further aspects of the example system environment for application-specific virtualized graphics processing, including provisioning of a virtual compute instance with a plurality of application-specific virtual GPUs attached, according to one embodiment. The elastic graphic service 110 may attach application-specific virtual GPUs to the instance 141C in accordance with the virtual GPU classes selected for the corresponding applications 620A-620N. As shown in FIG. 7B, a virtual GPU 151C based on the selected virtual GPU class "C" may be attached to the instance 141C for exclusive use by application 620A. Similarly, a virtual GPU 151N based on the selected virtual GPU class "N" may be attached to the instance 141C for exclusive use by application 620N. The provisioned virtual GPUs 151C-151N may be implemented by the GPU virtualization functionality 150 using suitable physical resources such as one or more physical GPUs 152A-152N. To implement the virtual compute instance 141C with the attached virtual GPUs 151C-151N, a physical compute instance may communicate with one or more physical GPUs, e.g., over a network. The physical GPUs may be located in a different computing device than the physical compute instance. Even though they may be implemented using separate hardware, the virtual GPUs 151C-151N may be said to be attached to the virtual compute instance 141C, or the virtual compute instance may be said to include the virtual GPUs. The virtual GPUs may be installed on one or more devices that may reside in various locations relative to the physical GPU, e.g., on the same rack, the same switch, the same room, and/or other suitable locations on the same network. The vendor(s) of the physical GPUs may be hidden from the client device that uses the virtual compute instance 141C.

The virtual compute instance 141C may be configured to execute the applications 620A-620N. Execution of the application 620A may include using the virtual GPU 151C to generate output based on data supplied to the virtual GPU by the application. The virtual GPU 151C may be attached to the virtual compute instance 141C specifically for use by the particular application 620A. The application-specific virtual GPU 151C may be dedicated to the particular application 620A, and other applications running on the virtual compute instance 141C may have no access to this particular virtual GPU 151C. Similarly, execution of the application 620N may include using the virtual GPU 151N to generate output based on data supplied to the virtual GPU by the application. The virtual GPU 151N may be attached to the virtual compute instance 141C specifically for use by the particular application 620N. The application-specific virtual GPU 151N may be dedicated to the particular application 620N, and other applications running on the virtual compute instance 141C may have no access to this particular virtual GPU 151N. In one embodiment, one or more other applications on the virtual compute instance 141C may not have access to any virtual GPUs, e.g., if the graphics requirements for the other applications are not sufficient to justify the cost of a virtual GPU.

In one embodiment, the applications 620A-620N may interact with one or more graphics drivers 321, as previously discussed with respect to FIG. 3. The graphics driver(s) 321 may interact with the virtual GPUs 151C-151N to provide graphics processing for the respective applications 620A-620N. The graphics processing may include accelerated two-dimensional graphics processing and/or accelerated three-dimensional graphics processing. In one embodiment, the graphics driver(s) 321 may implement a graphics application programming interface (API) such as Direct3D or OpenGL. The graphics driver(s) 321 may represent components running in user mode and/or kernel mode. As also as previously discussed with respect to FIG. 3, a client device may communicate with the virtual compute instance 141C through a proxy 310. Various other communications may be sent through the proxy 310, including for example virtual GPU output from the virtual GPUs 151C-151N to the client device. Use of the proxy 310 may hide the address of the virtual compute instance 141C and any associated resources (including one or more computing devices that implement the virtual GPUs 151C-151N) from the client device.

In various embodiments, any suitable technique(s) may be used to offload graphics processing from the virtual compute instance 141C to one or more physical GPUs used to implement the application-specific virtual GPUs 151C-151N. In one embodiment, an API shim may intercept calls to a graphics API and marshal the calls over a network to one or more external computing devices that include physical GPUs. The API shim may be application-specific, such that an instance of a dynamic link library (DLL) for graphics processing may be opened in the context of the process for each application that has a dedicated virtual GPU. The DLL may connect to a particular one of the virtual GPUs 151C-151N and provide exclusive access to that virtual GPU on behalf of the corresponding application. The applications may be implemented using application virtualization containers, and the API shim layer may be built into the container for an application.

As discussed previously with respect to FIG. 4, the virtual compute instance 141C may be implemented using a physical compute instance, and the virtual GPUs 151C-151N attached to that instance 141C may be implemented using one or more graphics servers 420. The virtual compute instance 141C may use a virtual interface 400 to interact with an interface device 410. The virtual interface 400 may enable the virtual compute instance 141C to send and receive network data. The interface device 410 may include a network interface and a custom hardware interface. Via the custom hardware interface, the interface device 410 may run program code to emulate a GPU interface and appear to the virtual compute instance 141C to implement or include the application-specific virtual GPUs 151C-151N. In one embodiment, the interface device 410 may present a graphics API to the virtual compute instance 141C and receive API calls for graphics processing (e.g., accelerated 3D graphics processing). Via the network interface, the interface device 410 may communicate with the graphics server 420 (and thus with the physical GPU 152B) over a network. The interface device 410 may be implemented in any suitable manner, e.g., as an expansion card (such as a PCI Express card) or attached peripheral device for the physical compute instance 142B. The interface device 410 may use single root I/O virtualization to expose hardware virtual functions to the virtual compute instance 141C.

Figure 7C:
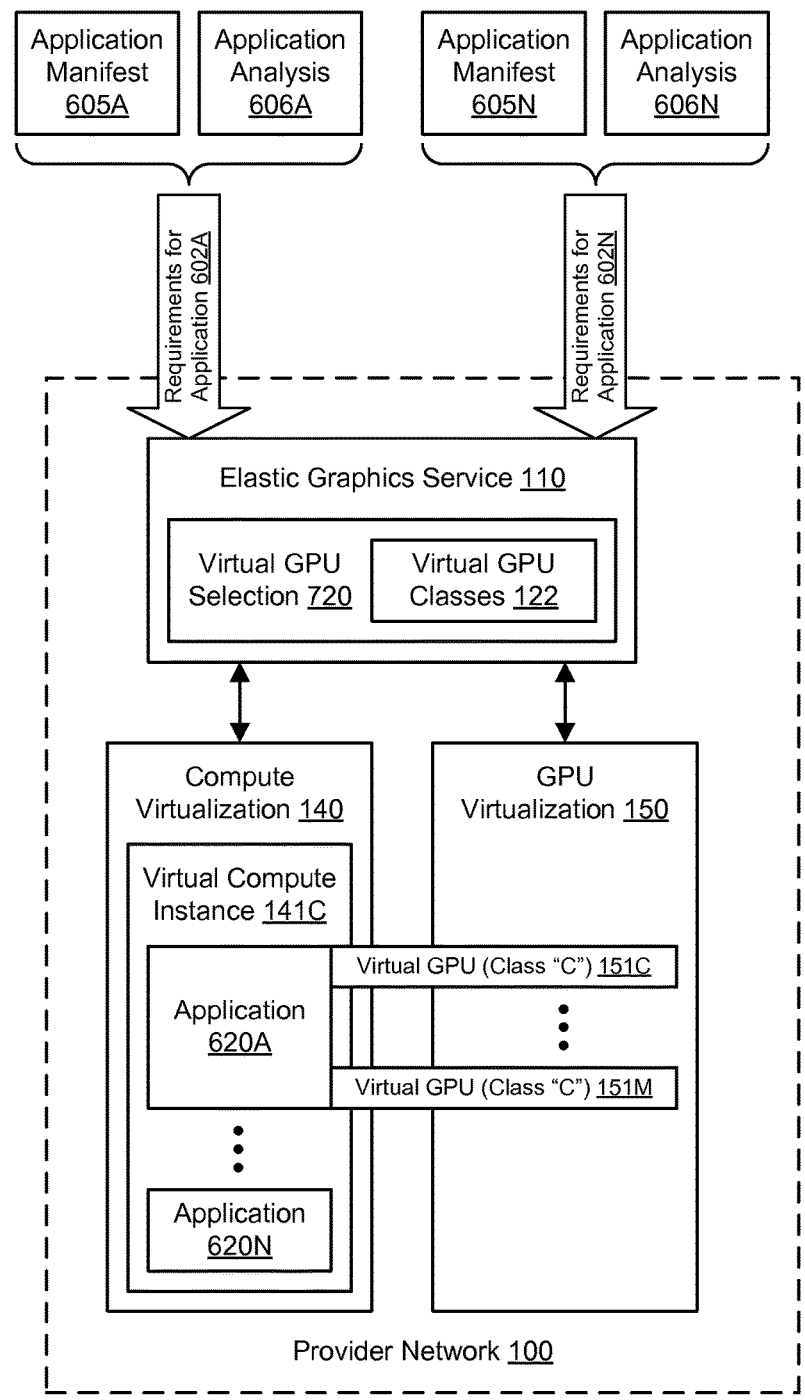
FIG. 7C illustrates further aspects of the example system environment for application-specific virtualized graphics processing, including provisioning of a virtual compute instance with a plurality of application-specific virtual GPUs dedicated to a single application, according to one embodiment.

FIG. 7C illustrates further aspects of the example system environment for application-specific virtualized graphics processing, including provisioning of a virtual compute instance with a plurality of application-specific virtual GPUs dedicated to a single application, according to one embodiment. In one embodiment, the elastic graphics service 110 may decline select and attach multiple virtual GPUs for a particular application based on its requirements. As shown in the example of FIG. 7C, two or more virtual GPUs 151C-151M may be selected based on the requirements 602A for application 620A, and all the virtual GPUs may be attached to the instance 141C for exclusive use by the application 620A. The two or more virtual GPUs 151C-151M selected for the application 620A may collectively meet or exceed the requirements 602A. In one embodiment, the two or more virtual GPUs 151C-151M may be of the same class, e.g., class "C," to facilitate concurrent use by the application 620A. Two or more GPUs may be dedicated to a specific application for any suitable reason(s). For example, two or more virtual GPUs may be dedicated to a particular application if no single virtual GPU can meet the requirements of the application. As another example, two or more virtual GPUs may be dedicated to a particular application if no single virtual GPU that meets the requirements of the application is currently available in the multi-tenant provider network. As yet another example, two or more virtual GPUs may be dedicated to a particular application if no single virtual GPU that meets the requirements of the application is currently available within a budget specified by a client.

Any suitable techniques may be used to permit a single application to use multiple virtual GPUs. In one embodiment, input data from the application 620A may be broadcast to all of the application-specific virtual GPUs 151C-151M, and the virtual GPUs may operate in a concurrent manner on different portions of the input data. The broadcasting may be performed using an API shim. The workload may then be divided among the virtual GPUs 151C-151M, e.g., based on the relative capabilities of the virtual GPUs. For example, each of the virtual GPUs 151C-151M may be dedicated to a particular region of the display, and the output from the virtual GPUs may be combined to generate each frame. As another example, each of the virtual GPUs 151C-151M may be dedicated to a particular frame in a sequence (e.g., every other frame for two virtual GPUs), and the output from the virtual GPUs may be combined to generate a sequence of frames.

In one embodiment, the elastic graphics service 110 may decline to select and attach a virtual GPU for a particular application. As shown in the example of FIG. 7C, an application-specific virtual GPU may not be selected or attached for the application 620N based (at least in part) on the requirements 602N. A virtual GPU may not be dedicated to a specific application for any suitable reason(s). For example, a virtual GPU may not be dedicated to a particular application if the requirements for the application do not justify the cost (to the client) of a virtual GPU and/or the additional network latency introduced by GPU virtualization. As another example, a virtual GPU may not be dedicated to a particular application if no virtual GPU that meets the requirements of the application is currently available in the multi-tenant provider network. As yet another example, a virtual GPU may not be dedicated to a particular application if no virtual GPU is currently available within a budget specified by a client. In one embodiment, the application 620N may still have access to graphics processing provided by a local GPU (as discussed below with respect to FIG. 9A through FIG. 11) and/or a virtual GPU that is attached to the instance 141C but is not application-specific.

Figure 8:
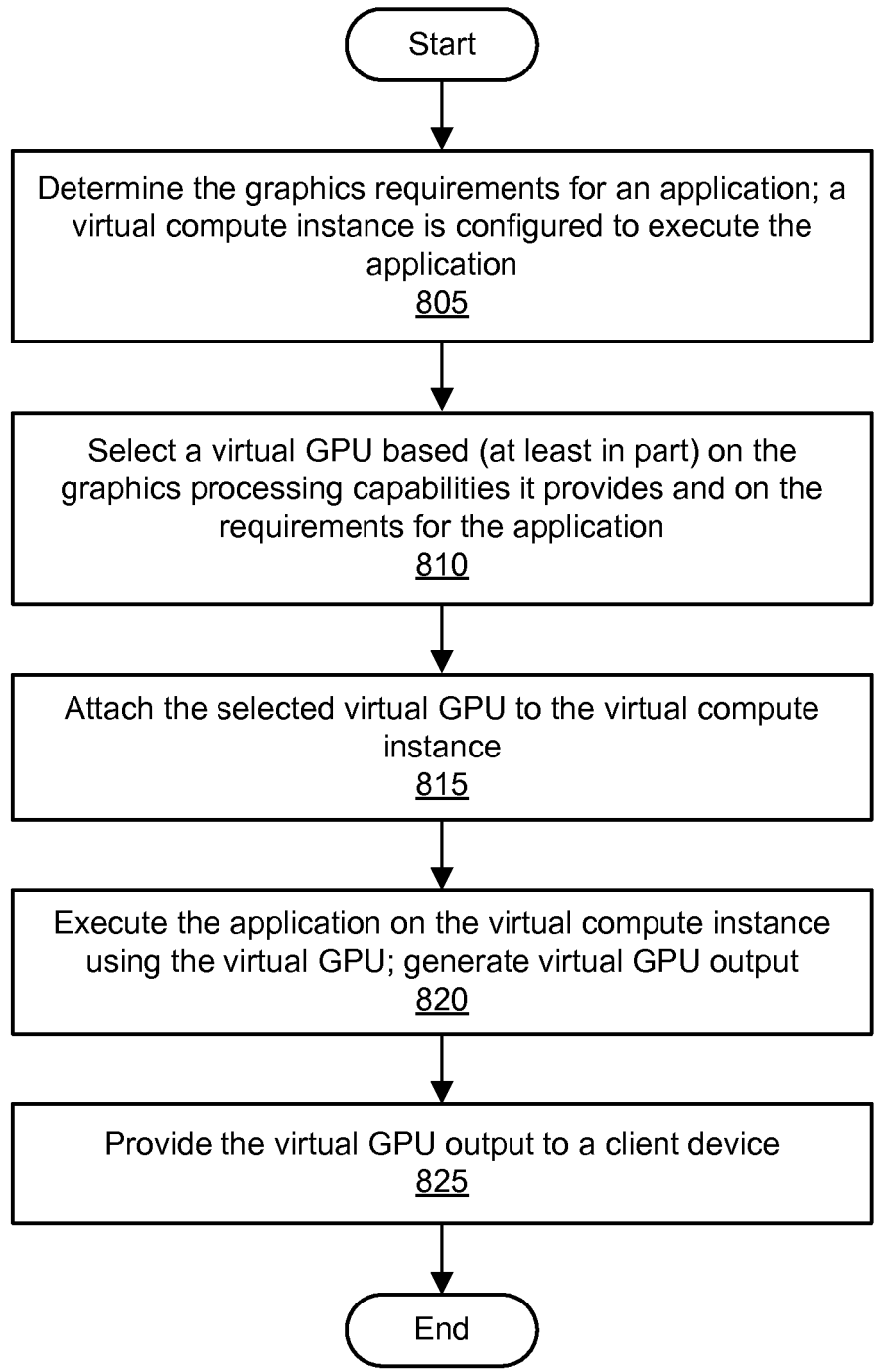
FIG. 8 is a flowchart illustrating a method for providing application-specific virtualized graphics processing, according to one embodiment.

FIG. 8 is a flowchart illustrating a method for providing application-specific virtualized graphics processing, according to one embodiment. As shown in 805, the graphics requirements for an application may be determined. A virtual compute instance may be configured to execute the application. In one embodiment, an elastic graphics service may receive the graphics requirements for the application, e.g., from a client, or may otherwise determine the requirements without client input. The graphics requirements may specify a recommended graphics processing unit (GPU) class, a recommended size for video memory, or other GPU features and/or configurations that are recommended to run the application. In one embodiment, the graphics requirements may be determined using an application manifest that specifies required or recommended characteristics of a platform or environment for executing the application, including characteristics of a physical compute instance or virtual compute instance. The application manifest may be determined and provided by a developer of the corresponding application who seeks a degree of control over the type of platform or environment on which the application is executed. In one embodiment, programmatic analysis of the application may determine the graphics requirements for the application. The analysis may include runtime analysis of a graphics workload demanded by the application and/or analysis of an execution history (including graphics workload) of the application, e.g., using similar virtual hardware as the current instance. The graphics workload for the application, either current or historical, may be based on any suitable metrics relating to use of a virtual GPU or underlying physical GPU, such as the number of primitives sent to the GPU, the number of operations requested of the GPU, the video memory used by the GPU, and/or the rate of output from the GPU over a period of time. The operation shown in 805 may be performed multiple times for multiple applications, such that the different graphics requirements for multiple applications may be determined for a particular instance.

As shown in 810, a virtual GPU may be selected. The virtual GPU may be selected based (at least in part) on the graphics processing capabilities it provides and on the graphics requirements for the application. For example, if the graphics requirements specify a minimum set of resources for a virtual GPU to be used with an application, then a virtual GPU may be selected that meets or exceeds those minimum set of resources. The virtual GPU may be selected from a set of virtual GPU classes characterized by their differing computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. The application-specific graphics requirements may be used to select a particular virtual GPU class. For example, the graphics requirements may specify or map directly to a particular virtual GPU class. As another example, the graphics requirements may specify the desired resources of a virtual GPU class, and a particular virtual GPU class may be selected based on such requirements. The virtual GPU may also be selected based (at least in part) on availability of resources in a resource pool of a provider network that manages such resources. The operation shown in 810 may be performed multiple times for multiple applications, such that multiple application-specific virtual GPUs may be selected based (at least in part) on the different graphics requirements for multiple applications.

As shown in 815, the selected virtual GPU may be attached to the virtual compute instance. In one embodiment, the elastic graphics service may interact with one or more other services or functionalities of a provider network, such as a compute virtualization functionality and/or GPU virtualization functionality, to attach the virtual GPU to the instance. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network. The operation shown in 815 may be performed multiple times for multiple applications, such that multiple application-specific virtual GPUs may be attached to the same instance for multiple applications. The operations shown in 810 and 815 may be performed in response to user input or in response to an automatic determination, e.g., by an elastic graphics service.

As shown in 820, the application may be executed on the virtual compute instance using the application-specific virtual GPU. Execution of the application may include execution of instructions on the virtual compute instance (e.g., on the underlying physical compute instance) and/or virtual GPU (e.g., on the underlying physical GPU). Execution of the application using the application-specific virtual GPU may generate virtual GPU output, e.g., output produced by executing instructions or otherwise performing tasks on the virtual GPU. Additional applications on the virtual compute instance may use different application-specific virtual GPUs, and the application-specific virtual GPUs may vary in graphics processing capabilities based on the varying requirements of the applications. The operation shown in 820 may be performed multiple times for multiple applications, such that multiple application-specific virtual GPUs may be used on the same instance by multiple applications.

As shown in 825, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Local-to-Remote Migration for Virtualized Graphics Processing

In some embodiments, the graphics processing for one GPU associated with a virtual compute instance maybe migrated to a virtual GPU. In one embodiment, the graphics processing provided by a local GPU may be migrated to a virtual GPU. In one embodiment, the graphics processing provided by a first virtual GPU may be migrated to a second virtual GPU. The local GPU may be implemented using attached hardware (e.g., in a physical compute instance used to implement the virtual compute instance) or using emulation. Because the local GPU may provide only a low level of graphics processing capability, a virtual GPU may be attached to the virtual compute instance to provide improved graphics processing relative to the local GPU. In one embodiment, the migration of graphics processing may be performed based (at least in part) on detection of an increase in graphics workload. Live migration may be performed while applications are being executed using the original GPU in a manner that does not require changing or relaunching the applications. Migration of the virtual compute instance to a different virtual compute instance may also be performed, e.g., to reduce network latency associated with virtualized graphics processing. Graphics processing for a virtual compute instance may also be migrated from one virtual GPU to another virtual GPU, e.g., from a less capable or smaller virtual GPU class to a more capable or larger virtual GPU class.

Figure 9A:
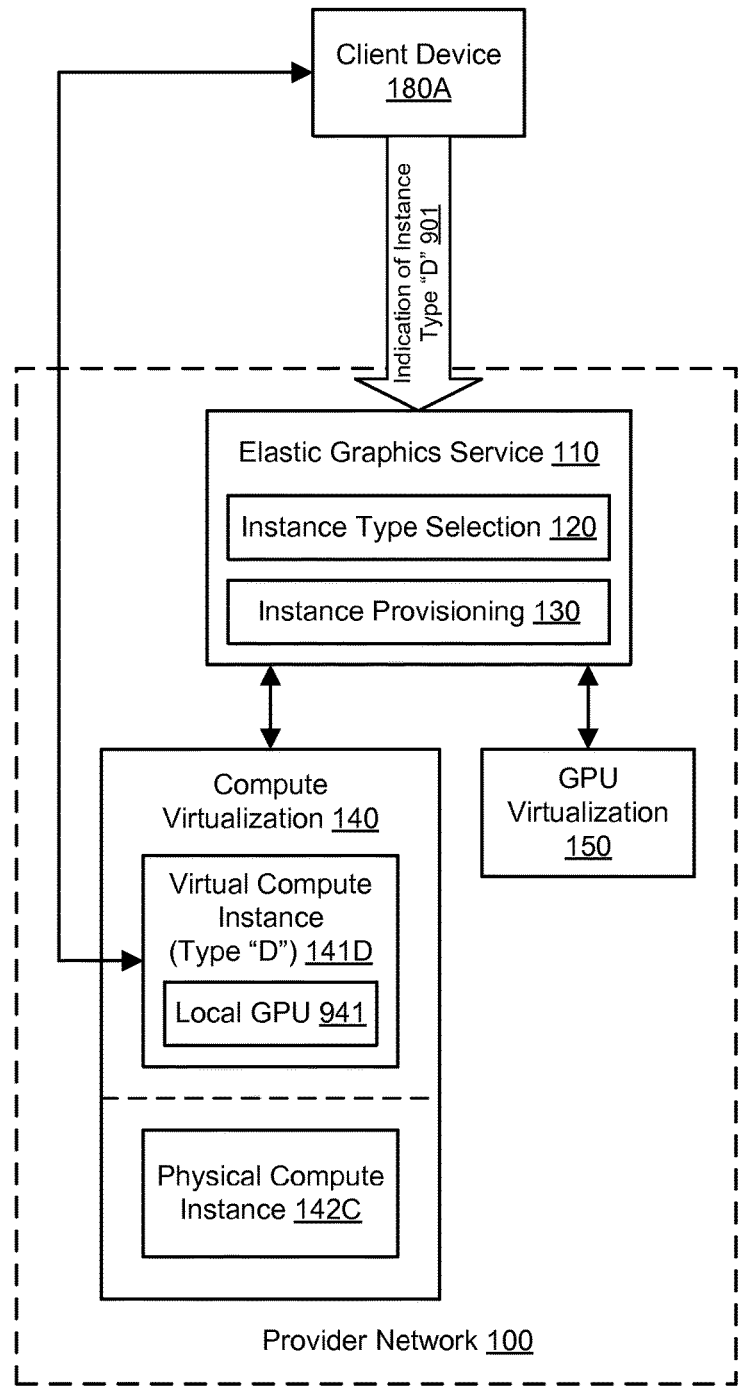
FIG. 9A illustrates an example system environment for local-to-remote migration for virtualized graphics processing, including provisioning of a virtual compute instance with a local GPU, according to one embodiment.

FIG. 9A illustrates an example system environment for local-to-remote migration for virtualized graphics processing, including provisioning of a virtual compute instance with a local GPU, according to one embodiment. As discussed above, the elastic graphics service 110 may offer, to clients, selection and provisioning of virtualized compute instances, potentially with attached virtualized GPUs. The elastic graphics service 110 may include an instance type selection functionality 120 and an instance provisioning functionality 130. As discussed above, the provider network 100 may offer to the client device 180A a plurality of instance types for virtual compute instances. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 901 of a particular instance type. For example, a client may choose or the instance type "B" from a predefined set of instance types using input 901. As another example, a client may specify the desired resources of an instance type using input 901, and the instance type selection functionality 120 may select the instance type "D" based on such a specification. Accordingly, the virtual compute instance type may be selected by the client or on behalf of the client, e.g., using the instance type selection functionality 120.

The instance provisioning functionality 130 may provision a virtual compute instance 141D with a local GPU 941 based on the instance type "D." The provisioned virtual compute instance 141D may be implemented by the compute virtualization functionality 140 using suitable physical resources such as a physical compute instance 142C. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

At the time of its provisioning, the instance 141D may not have an attached virtual GPU. The provisioned instance 141D may be of an instance type that includes the local GPU 941 in a default configuration. In one embodiment, the local GPU 941 may be implemented as a hardware component of the physical compute instance 142C used to implement the virtual compute instance. For example, the local GPU 941 may be implemented using the network-capable, customizable interface device 410 shown in FIG. 4. Alternatively, the local GPU 941 may be implemented using a dedicated physical GPU installed in or attached to the physical compute instance 142C. In one embodiment, the local GPU 941 may be implemented in software using emulation techniques. Typically, the local GPU 941 may provide a low level of graphics processing capabilities in comparison to the virtual GPUs available through the GPU virtualization functionality 150 of the provider network 100.

The virtual compute instance 141D may be used to execute one or more applications. At least one of the applications may use the local GPU 941, e.g., for graphics processing. At some point, a change in graphics workload for the local GPU 941 may be detected during the use of the virtual compute instance 141D. The change in graphics workload may be determined based on user input or automatically detected based on programmatic monitoring. For example, a user may indicate that the graphics workload is expected to change for a currently running application or due to an application that will be added to the instance; the user-supplied indication may include a general request for a more capable virtual GPU or an identification of a specific class of virtual GPU. An automatically detected change in the graphics workload may be based on any suitable metrics relating to use of a GPU, such as the number of primitives sent to the GPU, the number of operations requested of the GPU, the video memory used by the GPU, and/or the rate of output from the GPU over a period of time. The detected change may typically represent an increase in graphics workload, e.g., an increase beyond the graphics capabilities of the local GPU 941. For example, if the application is using the local GPU 941 to produce full-screen 2D or 3D graphics, the graphics workload may increase such that the frames per second (fps) decreases below a threshold of acceptable performance. As another example, the aggregate graphics workload generated by multiple applications may push the local GPU 941 beyond a threshold of acceptable performance as additional applications are executed simultaneously. Any suitable techniques may be used for monitoring of the graphics workload and detecting a change therein, and any suitable thresholds may be used to assess when the graphics workload has increased sufficiently to justify the attachment of a virtual GPU.

Figure 9B:
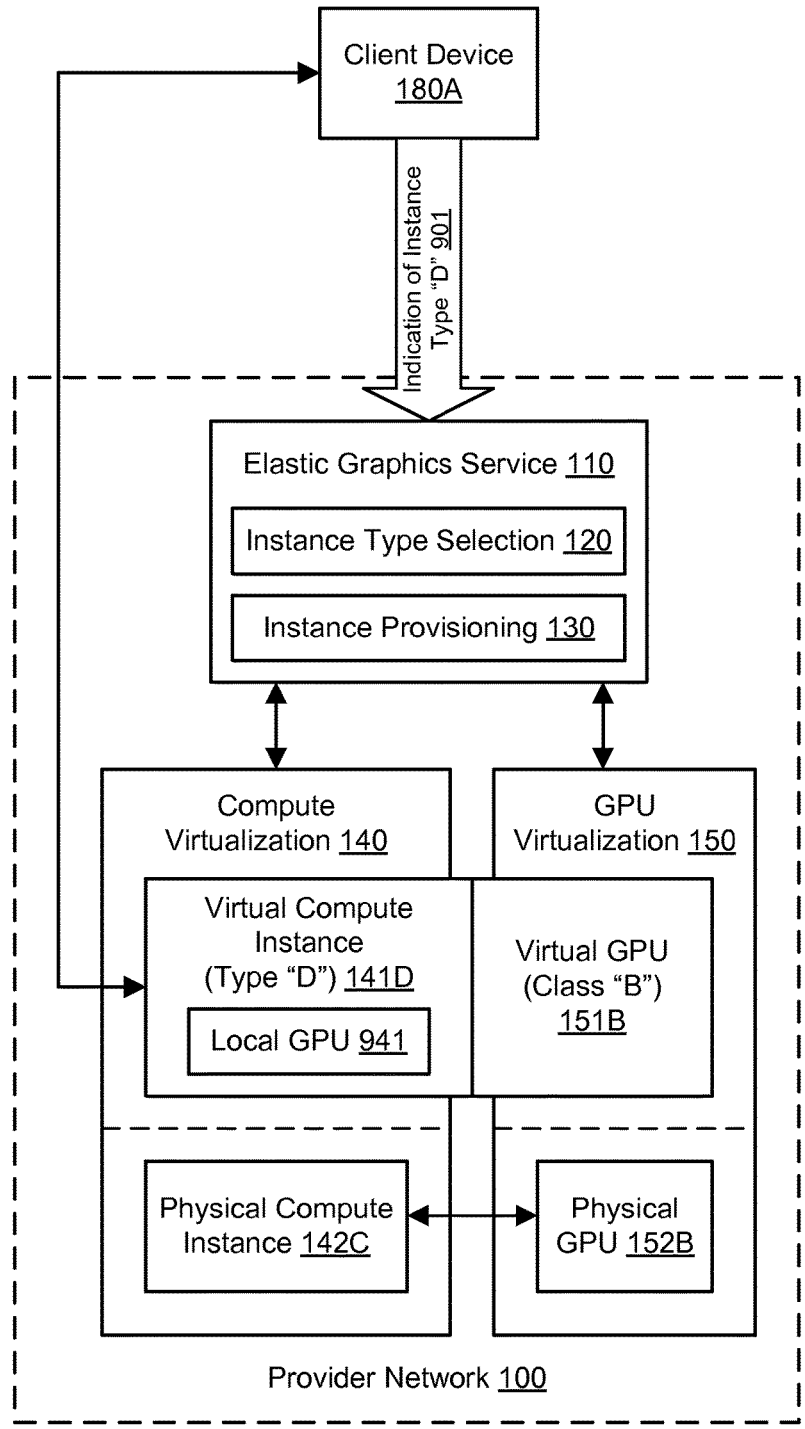
FIG. 9B illustrates further aspects of the example system environment for local-to-remote migration for virtualized graphics processing, including the selection and attachment of a virtual GPU to the virtual compute instance, according to one embodiment.

FIG. 9B illustrates further aspects of the example system environment for local-to-remote migration for virtualized graphics processing, including the selection and attachment of a virtual GPU to the virtual compute instance, according to one embodiment. As discussed above, the provider network 100 may offer a plurality of virtual GPU classes for virtual GPUs. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. A particular virtual GPU 151B may be selected for use with the virtual compute instance 141D, e.g., to replace or supplement the use of the local GPU 941. The virtual GPU 151B may be selected from a set of virtual GPU classes having different graphics processing capabilities. The virtual GPU 151B may be selected to match the current or anticipated graphics workload of the virtual compute instance. Accordingly, the selected virtual GPU 151B may be of a class, such as class "B," that is capable of handling the graphics workload with an acceptable level of performance. In one embodiment, the elastic graphics service may store benchmarks or other metrics for each class of virtual GPU to indicate the graphics processing capabilities relative to various levels of graphics workload. In one embodiment, the virtual GPU 151B may be selected not based on a detected change in the graphics workload but on a configuration change requested by or enabled by a user of the virtual compute instance. For example, if a new application is added to the virtual compute instance during its use, an application manifest for the new application may require greater GPU performance than the instance currently provides (e.g., with the local GPU).

The selected virtual GPU 151B may be attached to the virtual compute instance 141D. In one embodiment, the elastic graphics service 110 may interact with one or more other services or functionalities of a provider network 100, such as a compute virtualization functionality 140 and/or GPU virtualization functionality 150, to attach the virtual GPU 151B to the instance 141D. The virtual compute instance 141D may be implemented using central processing unit (CPU) resources and memory resources of a physical compute instance 142C. The virtual GPU 151B may be implemented using a physical GPU 152B. The physical GPU 152B may be attached to a different computing device than the computing device 142C that provides the CPU resources for the virtual compute instance 141D. The physical GPU 152B may be accessible to the physical compute instance 142C over a network. The virtual GPU 151B may be said to be attached to the virtual compute instance 141D, or the virtual compute instance 141D may be said to include the virtual GPU 151B. In one embodiment, the physical GPU 152B may be shared between the virtual GPU 151B and one or more additional virtual GPUs, and the additional virtual GPUs may be attached to additional virtual compute instances. In one embodiment, the virtual GPU 151B may be accessible to the virtual compute instance 141D via an interface device that includes a network interface and a custom hardware interface. Via the custom hardware interface, the interface device may emulate a GPU and appear to the virtual compute instance 141D to include the virtual GPU 151B. Via the network interface, the interface device may communicate with the physical GPU 152B over the network.

Graphics processing for the virtual compute instance 141D may be migrated from the local GPU 941 to the remotely located virtual GPU 151B. Migration of graphics processing may represent replacing the graphics processing provided by the local GPU 941 with the graphics processing provided by the virtual GPU 151B with respect to one or more applications. Graphics processing may include the execution of instructions on a GPU, often to produce graphical output based on input. Migration of graphics processing may include discontinuing use of the local GPU 941 for graphics processing and initiating use of the virtual GPU 151B for graphics processing with respect to one or more applications. In some circumstances, the migration may be performed at a time when no applications are using the local GPU 941. More typically, the migration may be initiated during execution of one or more applications and while the application(s) are using the local GPU 941. In one embodiment, the graphics processing may be migrated from the local GPU 941 to the virtual GPU 151B based (at least in part) on the increase in the graphics workload. In one embodiment, the local-to-remote migration may be performed based (at least in part) for business reasons, e.g., if a budget for a client is increased such that the cost of a virtual GPU can be justified for that client.

When applications are using the local GPU 941 when migration is initiated, the migration may be referred to as live migration. To implement live migration, any currently running applications may be paused, an interface of the application(s) to the local GPU 941 may be replaced by an interface to the virtual GPU 151B, any graphics instructions and/or data may be transferred to the virtual GPU, and then the virtual GPU may be used to resume the graphics processing. In one embodiment, a shim (such as an API shim) may keep track of graphics resources (e.g., textures, render targets, and so on) that are used by the source GPU. To perform the migration, those graphics resources may be requested, copied via handles, and recreated on the target GPU. The memory and execution stack may be synchronized between the source GPU and the target GPU; once the target GPU is caught up, the instance may be paused to perform the migration. In one embodiment, input data may be broadcast to the local GPU 941 as well as the virtual GPU 151B until the virtual GPU is ready to take over graphics processing. In one embodiment, the video memory on the local GPU 941 may be marked as copy-on-write, the contents of video memory on the local GPU may be transferred to the virtual GPU 151B, and then the "dirty" regions in the memory on the local GPU may be updated on the virtual GPU.

As discussed above with respect to FIG. 3, any suitable technique(s) may be used to offload graphics processing from a virtual compute instance to a virtual GPU on a different computing device. In one embodiment, an API shim may intercept calls to a graphics API and marshal the calls to an interface device that implements the local GPU. Within the interface device or at the API shim level, an interface to the local GPU 941 may be replaced by an interface to the virtual GPU 151B such that the graphics processing is migrated seamlessly and transparently with respect to the application(s), e.g., without needing to modify or relaunch the application(s). In one embodiment, a hardware shim may surface a hardware interface to the virtual compute instance and marshal attempts by the instance to interact with the local GPU.

The physical compute instance 142C and physical GPU 152B may be located in the same rack, in different racks in the same data center, in different data centers, in different availability zones or regions, or in any other locations relative to one another. In one embodiment, migration of the virtual compute instance to a different virtual compute instance may also be performed along with local-to-remote migration of graphics processing. Migration of the virtual compute instance may be performed to move to an underlying physical compute instance that is closer to the selected virtual GPU, e.g., such that the physical compute instance 142C and physical GPU 152B are in the same rack or otherwise in nearby locations in the same data center. Any suitable heuristic(s) may be used to determine whether to migrate the virtual compute instance and/or to select the placement of the destination physical compute instance. For example, the migration of the virtual compute instance may be performed to reduce network latency associated with virtualized graphics processing and/or to reduce usage of a network for virtualized graphics processing. Migration of the instance may include live migration, such that one or more applications executing on the virtual compute instance may be paused on the source instance and then resumed on the destination instance.

Figure 10:
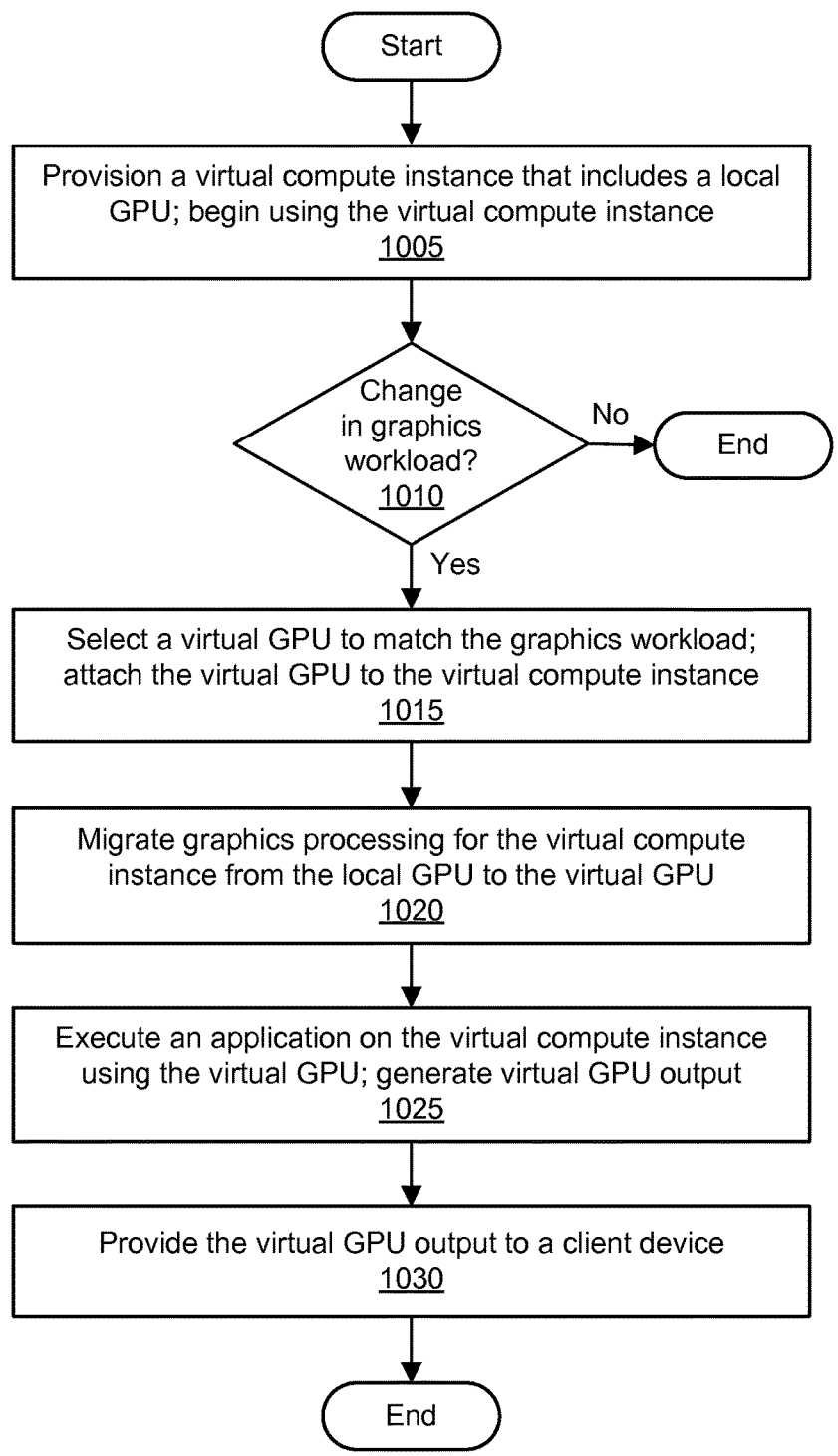
FIG. 10 is a flowchart illustrating a method for local-to-remote migration of graphics processing from a local GPU to a virtual GPU, according to one embodiment.

FIG. 10 is a flowchart illustrating a method for local-to-remote migration of graphics processing from a local GPU to a virtual GPU, according to one embodiment. As shown in 1005, a virtual compute instance may be provisioned from a multi-tenant provider network. The multi-tenant provider network may include a plurality of computing devices configured to implement a plurality of virtual compute instances. The virtual compute instance may include a local graphics processing unit (GPU). The provisioned instance may be of an instance type that includes the local GPU in a default configuration. In one embodiment, the local GPU may be implemented as a hardware component of the physical compute instance used to implement the virtual compute instance. For example, the local GPU may be implemented using the network-capable, customizable interface device 410 shown in FIG. 4. Alternatively, the local GPU may be implemented using a physical GPU installed in the physical compute instance. In one embodiment, the local GPU may be implemented in software using emulation techniques. Typically, the local GPU may provide a low level of graphics processing capabilities in comparison to the virtual GPUs available through an elastic graphics service of the provider network.

Turning back to FIG. 10, the virtual compute instance may be used to execute one or more applications. At least one of the applications may use the local GPU, e.g., for graphics processing. As shown in 1010, a change in graphics workload for the local GPU may be determined during the use of the virtual compute instance. The change in graphics workload may be determined based on user input or automatically detected based on programmatic monitoring. For example, a user may indicate that the graphics workload is expected to change for a currently running application or due to an application that will be added to the instance; the user-supplied indication may include a general request for a more capable virtual GPU or an identification of a specific class of virtual GPU. An automatically detected change in the graphics workload may be based on any suitable metrics relating to use of a GPU, such as the number of primitives sent to the GPU, the number of operations requested of the GPU, the video memory used by the GPU, and/or the rate of output from the GPU over a period of time. The detected change may typically represent an increase in graphics workload, e.g., an increase beyond the graphics capabilities of the local GPU. For example, if the application is using the local GPU to produce full-screen 2D or 3D graphics, the graphics workload may increase such that the frames per second (fps) decreases below a threshold of acceptable performance. As another example, the aggregate graphics workload generated by multiple applications may push the local GPU beyond a threshold of acceptable performance as additional applications are executed simultaneously. Any suitable techniques may be used for monitoring of the graphics workload and detecting a change therein, and any suitable thresholds may be used to assess when the graphics workload has increased sufficiently to justify the attachment of a virtual GPU. If a change in the graphics workload is determined, then the method may proceed to the operation shown in 1015.

As shown in 1015, a virtual GPU may be selected for use with the virtual compute instance, e.g., to replace or supplement the use of the local GPU. The virtual GPU may be selected from a set of virtual GPU classes having different graphics processing capabilities. The virtual GPU may be selected to match the current or anticipated graphics workload of the virtual compute instance. Accordingly, the selected virtual GPU may be of a class that is capable of handling the graphics workload with an acceptable level of performance. In one embodiment, the elastic graphics service may store benchmarks or other metrics for each class of virtual GPU to indicate the graphics processing capabilities relative to various levels of graphics workload. In one embodiment, the virtual GPU may be selected not based on a detected change in the graphics workload but on a configuration change requested by or enabled by a user of the virtual compute instance. For example, if a new application is added to the virtual compute instance during its use, an application manifest for the new application may require greater GPU performance than the instance currently provides (e.g., with the local GPU).

The selected virtual GPU may be attached to the virtual compute instance. In one embodiment, the elastic graphics service may interact with one or more other services or functionalities of a provider network, such as a compute virtualization functionality and/or GPU virtualization functionality, to attach the virtual GPU to the instance. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 1020, graphics processing for the virtual compute instance may be migrated from the local GPU to the remote virtual GPU. Migration of graphics processing may represent replacing the graphics processing provided by the local GPU with the graphics processing provided by the virtual GPU with respect to one or more applications. Graphics processing may include the execution of instructions on a GPU, often to produce graphical output based on input. Migration of graphics processing may include discontinuing use of the local GPU for graphics processing and initiating use of the virtual GPU for graphics processing with respect to one or more applications. In some circumstances, the migration may be performed at a time when no applications are using the local GPU. More typically, the migration may be initiated during execution of one or more applications and while the application(s) are using the local GPU. In one embodiment, the graphics processing may be migrated from the local GPU to the virtual GPU based (at least in part) on the increase in the graphics workload.

When applications are using the local GPU when migration to the remote GPU is initiated, the migration may be referred to as live migration. To implement live migration, any currently running applications may be paused, an interface of the application(s) to the local GPU may be replaced by an interface to the virtual GPU, any graphics instructions and/or data may be transferred to the virtual GPU, and then the virtual GPU may be used to resume the graphics processing. As discussed above with respect to FIG. 3, any suitable technique(s) may be used to offload graphics processing from a virtual compute instance to a virtual GPU on a different computing device. For example, an API shim may intercept calls to a graphics API and marshal the calls to an interface device that implements the local GPU. Within the interface device or at the API shim level, an interface to the local GPU may be replaced by an interface to the virtual GPU such that the graphics processing is migrated seamlessly and transparently with respect to the application(s), e.g., without needing to modify or relaunch the application(s).

Turning back to FIG. 10, as shown in 1025, the application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. The techniques described herein for migration for virtualized graphics processing may be used with the techniques described herein for application-specific virtualized graphics processing. Accordingly, additional applications on the virtual compute instance may use different (e.g., application-specific) virtual GPUs and/or the local GPU, and the application-specific virtual GPUs and/or local GPU may vary in graphics processing capabilities based on the varying requirements of the applications.

As shown in 1030, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Illustrative Computer System

In at least some embodiments, a computer system that implements a portion or all of one or more of the technologies described herein may include a computer system that includes or is configured to access one or more computer-readable media. FIG. 11 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a virtual compute instance, wherein the virtual compute instance is implemented using central processing unit (CPU) resources and memory resources of a physical compute instance, wherein the virtual compute instance comprises a local graphics processing unit (GPU), and wherein the virtual compute instance is provided by a multi-tenant provider network;
    a physical GPU accessible to the virtual compute instance over a network;
    one or more computing devices comprising one or more processors and a memory, the memory storing instructions that, when executed on the one or more processors, cause the one or more processors to implement an elastic graphics service, wherein the elastic graphics service is configured to:
        attach a virtual GPU to the virtual compute instance, wherein the virtual GPU provides improved graphics processing relative to the local GPU, wherein the virtual GPU is selected from a plurality of virtual GPU classes based at least in part on computational or memory resources, and wherein the virtual GPU is implemented using the physical GPU;
    wherein the virtual compute instance is configured to:
        initiate execution of an application using the local GPU;
        migrate graphics processing from the local GPU to the virtual GPU during execution of the application; and
        execute the application using the virtual GPU.

2. The system as recited in claim 1, wherein the local GPU is implemented using a device comprising a network interface and a hardware interface, wherein the virtual GPU is accessible to the virtual compute instance via the device, wherein the device appears to the virtual compute instance to comprise the virtual GPU via the hardware interface, and wherein the device communicates with the physical GPU via the network interface.

3. The system as recited in claim 1, wherein the local GPU is implemented using emulation.

4. The system as recited in claim 1, wherein the virtual compute instance is configured to:
    detect a change in a workload of the local GPU during execution of the application using the local GPU;
    wherein the graphics processing is migrated from the local GPU to the virtual GPU during the execution of the application in response to the detected change in the workload of the local GPU.

5. A computer-implemented method, comprising:
    provisioning a virtual compute instance from a multi-tenant provider network, wherein the virtual compute instance comprises a local graphics processing unit (GPU), and wherein the multi-tenant provider network comprises a plurality of computing devices configured to implement a plurality of virtual compute instances;
    attaching a virtual GPU to the virtual compute instance, wherein the virtual GPU is implemented using a physical GPU, and wherein the physical GPU is accessible to the virtual compute instance over a network;
    initiate execution of an application using the local GPU on the virtual compute instance:
    migrating processing for the virtual compute instance from the local GPU to the virtual GPU during execution of the application; and
    executing the application using the virtual GPU on the virtual compute instance.

6. The method as recited in claim 5, wherein the virtual GPU provides improved processing relative to the local GPU.

7. The method as recited in claim 5, wherein the local GPU is implemented using a device comprising a network interface and a hardware interface, wherein the virtual GPU is accessible to the virtual compute instance via the device, wherein the device appears to the virtual compute instance to comprise the virtual GPU via the hardware interface, and wherein the device communicates with the physical GPU via the network interface.

8. The method as recited in claim 5, wherein the local GPU is implemented using emulation.

9. The method as recited in claim 5, further comprising:
receiving a request to migrate the processing from the local GPU to the virtual GPU during the execution of the application;
wherein the processing is migrated from the local GPU to the virtual GPU during the execution of the application in response to receiving the request.

10. The method as recited in claim 5, further comprising:
detecting an increase in workload during the execution of the application using the local GPU on the virtual compute instance;
wherein the processing is migrated from the local GPU to the virtual GPU based at least in part on the increase in the workload.

11. The method as recited in claim 5, further comprising:
attaching an additional virtual GPU to the virtual compute instance; and
migrating processing for the virtual compute instance from the virtual GPU to the additional virtual GPU.

12. The method as recited in claim 5, further comprising:
selecting a virtual GPU class for the virtual GPU from a plurality of virtual GPU classes, wherein the virtual GPU classes vary in respective computational resources or memory resources, and wherein the virtual GPU class is selected based at least in part on the respective computational resources or memory resources provided by the virtual GPU class.

13. A non-transitory computer-readable storage medium storing program instructions computer-executable to perform:
provisioning a virtual compute instance from a multi-tenant provider network, wherein the virtual compute instance comprises a local graphics processing unit (GPU), and wherein the multi-tenant provider network comprises a plurality of computing devices configured to implement a plurality of virtual compute instances; and
attaching a virtual GPU to the virtual compute instance, wherein the virtual GPU is implemented using a physical GPU, wherein the physical GPU is accessible to the virtual compute instance over a network, wherein execution of an application is initiated using the local GPU on the virtual compute instance, wherein graphics processing for the virtual compute instance is migrated from the local GPU to the virtual GPU during the execution of the application, and wherein the execution of the application is continued using the virtual GPU on the virtual compute instance.

14. The non-transitory computer-readable storage medium as recited in claim 13, wherein the virtual GPU provides improved graphics processing relative to the local GPU.

15. The non-transitory computer-readable storage medium as recited in claim 13, wherein the local GPU is implemented using a device comprising a network interface and a hardware interface, wherein the virtual GPU is accessible to the virtual compute instance via the device, wherein the device appears to the virtual compute instance to comprise the virtual GPU via the hardware interface, and wherein the device communicates with the physical GPU via the network interface.

16. The non-transitory computer-readable storage medium as recited in claim 13, wherein the execution of the application using the local GPU on the virtual compute instance is terminated in response to migrating the graphics processing from the local GPU to the virtual GPU during the execution of the application.

17. The non-transitory computer-readable storage medium as recited in claim 13, wherein an increase in graphics workload is detected during the execution of the application using the local GPU on the virtual compute instance, and wherein the graphics processing is migrated from the local GPU to the virtual GPU based at least in part on the increase in the graphics workload.

18. The non-transitory computer-readable storage medium as recited in claim 13, wherein the virtual compute instance is configured to execute a first application and a second application, wherein graphics processing for the first application is continued with the local GPU, and wherein graphics processing for the second application is migrated from the local GPU to the virtual GPU.

19. The non-transitory computer-readable storage medium as recited in claim 18, wherein the virtual GPU is selected based at least in part on requirements associated with the second application, and wherein the virtual GPU is reserved for use by the second application.

20. The non-transitory computer-readable storage medium as recited in claim 13, further comprising:
selecting a virtual GPU class for the virtual GPU from a plurality of virtual GPU classes, wherein the virtual GPU classes vary in respective computational resources or memory resources, and wherein the virtual GPU class is selected based at least in part on the respective computational resources or memory resources provided by the virtual GPU class.

* * * * *